US012585151B2

(12) United States Patent
Kim et al.

(10) Patent No.: US 12,585,151 B2
(45) Date of Patent: Mar. 24, 2026

(54) DISPLAY DEVICE

(71) Applicant: LG ELECTRONICS INC., Seoul (KR)

(72) Inventors: Hyungu Kim, Seoul (KR); Junhee Kong, Seoul (KR); Byungchun Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/993,993

(22) PCT Filed: Aug. 2, 2022

(86) PCT No.: PCT/KR2022/011375
§ 371 (c)(1),
(2) Date: Jan. 13, 2025

(87) PCT Pub. No.: WO2024/014607
PCT Pub. Date: Jan. 18, 2024

(65) Prior Publication Data
US 2026/0016714 A1 Jan. 15, 2026

(30) Foreign Application Priority Data
Jul. 13, 2022 (KR) ........................ 10-2022-0086087

(51) Int. Cl.
*G02F 1/1333* (2006.01)
*G02F 1/13357* (2006.01)

(52) U.S. Cl.
CPC .. *G02F 1/133317* (2021.01); *G02F 1/133602* (2013.01)

(58) Field of Classification Search
CPC ..................... G02F 1/133317; G02F 1/133602
See application file for complete search history.

(56) References Cited

U.S. PATENT DOCUMENTS

| | | | |
|---|---|---|---|
| 7,948,572 B2 * | 5/2011 | Bae ................... | G02F 1/133308 349/58 |
| 9,222,644 B2 * | 12/2015 | Lee .................... | G02B 19/0028 |
| 9,297,519 B2 * | 3/2016 | Lee .......................... | F21V 13/04 |
| 2008/0018862 A1 * | 1/2008 | Abe ....................... | G03B 21/26 353/30 |

(Continued)

FOREIGN PATENT DOCUMENTS

| | | |
|---|---|---|
| EP | 4361713 | 5/2024 |
| KR | 1020170049783 | 5/2017 |

(Continued)

OTHER PUBLICATIONS

KR20220075846A—Display Device, 8 pages. (Year: 2025).*

(Continued)

*Primary Examiner* — Tuyen K Vo
(74) *Attorney, Agent, or Firm* — LEE, HONG, DEGERMAN, KANG & WAIMEY

(57) ABSTRACT

A display device is provided. The display device includes: a display panel; a frame disposed at a rear of the display panel; a substrate disposed on the frame and having a light source that provides light; an inner frame coupled to the frame and supporting the display panel; and an optical layer disposed between the display panel and the inner frame, the optical layer placed on the inner frame.

10 Claims, 36 Drawing Sheets

(56)                    References Cited

U.S. PATENT DOCUMENTS

| | | | |
|---|---|---|---|
| 2010/0171897 A1* | 7/2010 | Yun ................... | G02F 1/133605 |
| | | | 349/58 |
| 2012/0050645 A1 | 3/2012 | Okada et al. | |
| 2015/0016090 A1 | 1/2015 | Lee et al. | |
| 2016/0187709 A1* | 6/2016 | Lee ........................ | H05K 1/189 |
| | | | 349/58 |
| 2017/0045738 A1* | 2/2017 | Kim ....................... | B60K 35/23 |
| 2017/0083273 A1* | 3/2017 | Kim ................. | G02F 1/133317 |
| 2017/0123274 A1* | 5/2017 | Jeong ................ | G02F 1/133608 |
| 2019/0025654 A1 | 1/2019 | Asamizu et al. | |
| 2021/0181582 A1* | 6/2021 | Yoon ................ | G02F 1/133314 |

FOREIGN PATENT DOCUMENTS

| | | |
|---|---|---|
| KR | 1020190116836 | 10/2019 |
| KR | 1020200084734 | 7/2020 |
| KR | 1020210077849 | 6/2021 |
| KR | 1020220075846 | 6/2022 |

OTHER PUBLICATIONS

WO2010073804A1—Frame for Light Source Device, Light Source Device, and Display Device, 73 pages. (Year: 2025).*
PCT International Application No. PCT/KR2022/011375, International Search Report dated Apr. 7, 2023, 2 pages.
European Patent Office Application Serial No. 22951262.9, Search Report dated Aug. 29, 2025, 11 pages.

* cited by examiner

DISPLAY DEVICE

CROSS-REFERENCE TO RELATED APPLICATION(S)

This application is the National Stage filing under 35 U.S.C. 371 of International Application No. PCT/KR2022/011375, filed on Aug. 2, 2022, which claims the benefit of earlier filing date and right of priority to Korean Application No. 10-2022-0086087, filed on Jul. 13, 2022, the contents of which are all incorporated by reference herein in their entirety.

TECHNICAL FIELD

The following description relates to a display device.

BACKGROUND ART

With the development of the information society, there have been growing demands for various types of display devices, and in order to meet these demands, various display devices, such as a liquid crystal display (LCD) device, organic light emitting diodes (OLED), a Micro LED, etc., have been researched and used recently.

Among them, the liquid crystal panel of the LCD includes a liquid crystal layer, and a TFT substrate and a color filter substrate that are opposite each other with the liquid crystal layer interposed therebetween, and may display an image by using light provided by a backlight unit.

Recently, as interest in image quality of a display device increases, color expression or color reproducibility close to true color has received considerable attention, and much research has been devoted to improving image quality to improve light uniformity and to realize true color.

DISCLOSURE OF INVENTION

Technical Problem

It is an object of the present disclosure to solve the above and other problems.

It is another object of the present disclosure to provide a display device having a coupling structure capable of accommodating thermal expansion and/or contraction of a backlight unit.

It is yet another object of the present disclosure to provide a display device having a firm coupling structure while reducing optical depth.

It is still another object of the present disclosure to provide a display device capable of improving luminance and optical uniformity of a backlight unit.

It is further another object of the present disclosure to provide a coupling structure of a display device capable of improving luminance and optical uniformity.

Solution to Problem

In accordance with an aspect of the present disclosure, the above and other objects can be accomplished by providing a display device including: a display panel; a frame disposed at a rear of the display panel; a substrate disposed on the frame and having a light source that provides light; an inner frame coupled to the frame and supporting the display panel; and an optical layer disposed between the display panel and the inner frame, the optical layer placed on the inner frame, wherein the inner frame includes: a support part on which the optical layer is placed; and the sub-support part disposed between the optical layer and the frame, the sub-support part formed on the inner frame, wherein the sub-support part includes: a lower surface disposed adjacent to the substrate; an inclined surface disposed adjacent to a lower surface of the optical layer, the inclined surface reflecting the light, provided by the light source, to the optical layer; and a side surface connecting the lower surface and the inclined surface, the side surface reflecting the light provided by the light source.

Advantageous Effects of Disclosure

The display device according to the present disclosure has the following effects.

According to at least one of the embodiments of the present disclosure, a display device having a coupling structure capable of accommodating thermal expansion and/or contraction of a backlight unit may be provided.

According to at least one of the embodiments of the present disclosure, a display device having a firm coupling structure while reducing optical depth may be provided.

According to at least one of the embodiments of the present disclosure, a display device capable of improving luminance and optical uniformity of a backlight unit may be provided.

According to at least one of the embodiments of the present disclosure, a coupling structure of a display device capable of improving luminance and optical uniformity may be provided.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

BRIEF DESCRIPTION OF DRAWINGS

FIGS. 1 to 36 are diagrams illustrating examples of a display device according to embodiments of the present disclosure.

MODE OF DISCLOSURE

Figure 1:
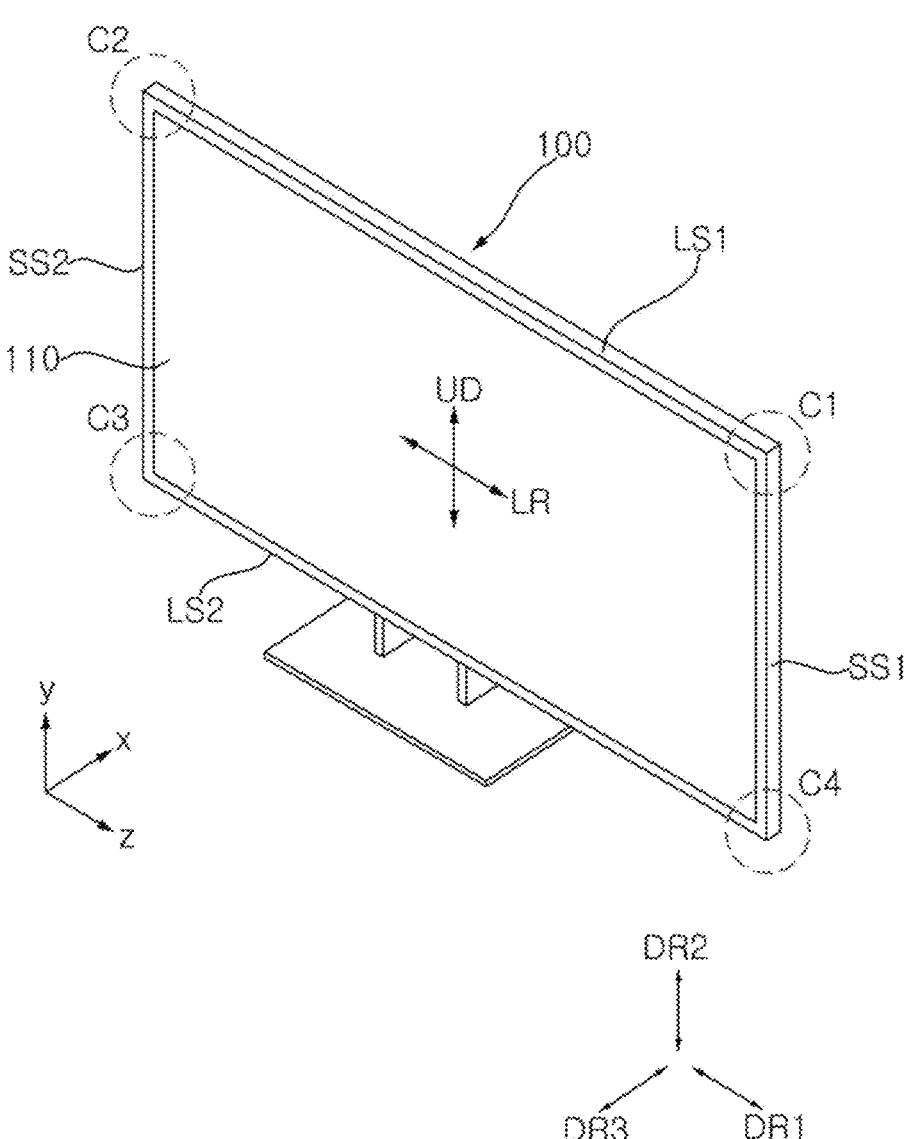

Hereinafter, the present disclosure will be described in detail with reference to the accompanying drawings, in which the same reference numerals are used throughout the drawings to designate the same or similar components, and a redundant description thereof will be omitted.

The suffixes, such as "module" and "unit," for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the present disclosure.

Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

The following description will be made using a liquid crystal display (LCD) device as an example of a display panel, but the display panel that is applicable to the present disclosure is not limited to the LCD device.

Referring to FIG. 1, a display device may include a first long side LS1, a second long side LS2 opposite to the first long side LS1, a first short side SS1 adjacent to one end of each of the first long side LS1 and the second long side LS2, and a second short side SS2 opposite to the first short side SS1.

Here, an area of the first short side SS1 may be referred to as a first side area, an area of the second short side SS2 may be referred to as a second side area opposite to the first side area, an area of the first long side LS1 may be referred to as a third side area adjacent to the first side area and the second side area and disposed between the first side area and the second side area, and an area of the second long side LS2 may be referred to as a fourth side area adjacent to the first side area and the second side area, disposed between the first side area and the second side area, and opposite to the third side area.

It is illustrated and described that the first and second long sides LS1 and LS2 are longer than the first and second short sides SS1 and SS2, but it is also possible that the lengths of the first and second long sides LS1 and LS2 may be approximately equal to the lengths of the first and second short sides SS1 and SS2.

A first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The first direction DR1 and the second direction DR2 may be collectively referred to as a horizontal direction. Further, the third direction DR3 may be referred to as a vertical direction.

A side or a surface, on which the display device displays an image, may be referred to as a forward direction or a front side or a front surface. When the display device displays an image, a side or a surface, at which the image cannot be observed, may be referred to as a rearward direction or a rear side or a rear surface.

When the display device is viewed from the forward direction or the front side or the front surface, the first long side LS1 may be referred to as an upper side or an upper surface. Likewise, the second long side LS2 may be referred to as a lower side or a lower surface. Likewise, the first short side SS1 may be referred to as a right side or a right surface, and the second short side SS2 may be referred to as a left side or a left surface.

The first long side LS1, the second long side LS2, the first short side SS1, and the second short side SS2 may be referred to as edges of the display device. Further, positions where the first long side LS1, the second long side LS2, the first short side SS1, and the second short side SS2 meet each other may be referred to as corners. For example, a position where the first long side LS1 and the first short side SS1 meet may be referred to as a first corner C1, a position where the first long side LS1 and the second short side SS2 meet may be referred to as a second corner C2, a position where the second short side SS2 and the second long side LS2 each other may be referred to as a third corner C3, and a position where the second long side LS2 and the first short side SS1 meet may be referred to as a fourth corner C4.

A direction from the first short side SS1 to the second short side SS2 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

Figure 2:
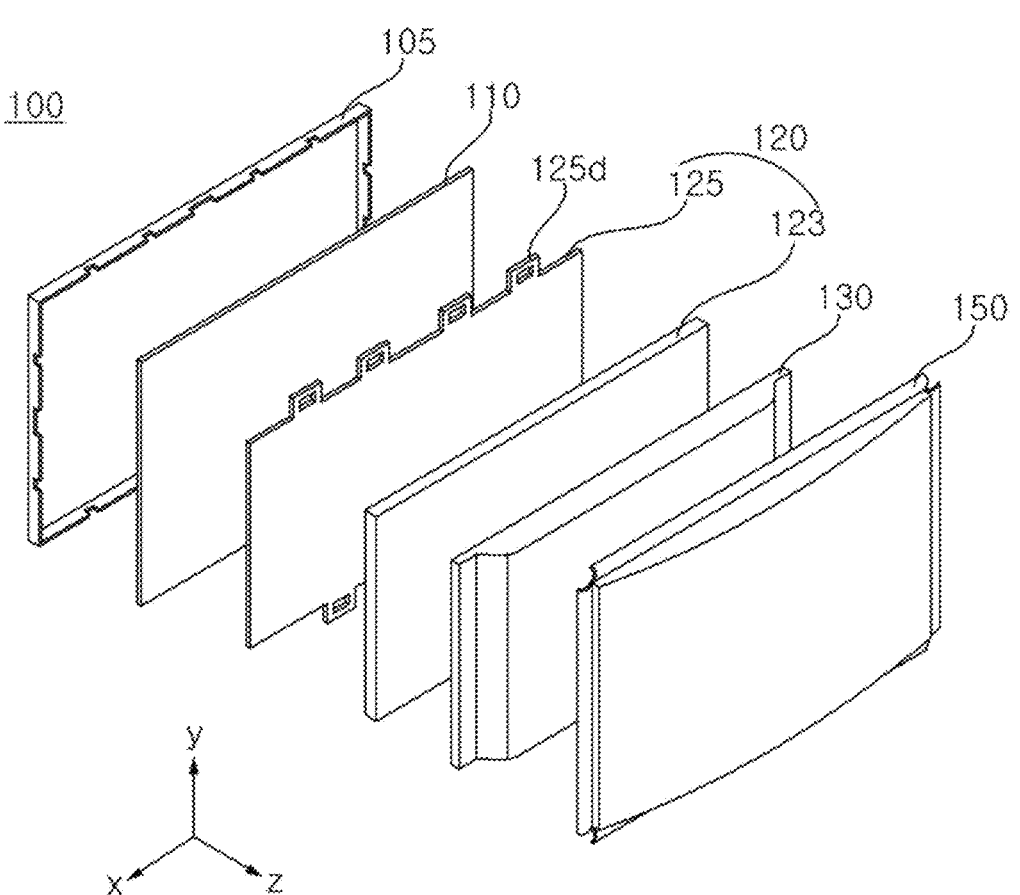

Referring to FIG. 2, a front cover 105 may cover at least a portion of the front and side surfaces of a display panel 110. The front cover 105 may be divided into a front cover located on the front surface of the display panel 110, and a side cover located on the side surface of the display panel 110. Either one of the front cover or the side cover may be omitted.

The display panel 110 may be provided on the front surface of the display device 100 and may display an image. The display panel 110 may display an image in such a manner that a plurality of pixels output red, green or blue (RGB) for each pixel according to the timing. The display panel 110 may be divided into an active area, on which an image is displayed, and a de-active area on which an image is not displayed. The display panel 110 may include a front substrate and a rear substrate which are disposed opposite each other with a liquid crystal layer interposed therebetween.

The front substrate may include a plurality of pixels composed of red (R), green (G), and blue (B) subpixels. The front substrate may emit light corresponding to red, green, or blue color in response to a control signal.

The rear substrate may include switching elements. The rear substrate may switch on or off pixel electrodes. For example, the pixel electrode may change a molecular arrangement of a liquid crystal layer in response to a control signal received from the outside. The liquid crystal layer may include liquid crystal molecules. The arrangement of the liquid crystal molecules may change depending on a difference in voltage generated between the pixel electrode and a common electrode. The liquid crystal layer may allow or interrupt the transmission of the light from a backlight unit 120 to the front substrate.

The backlight unit 120 may be disposed at the rear of the display panel 110. The backlight unit 120 may include light sources. The backlight unit 120 may be coupled to a frame 130 in front of the frame 130. The frame 130 may be referred to as a rear frame 130 or a main frame 130.

The backlight unit 120 may be driven by a full driving scheme or a partial driving scheme, such as local dimming, impulsive driving, or the like. The back light unit 120 may include an optical sheet 125 and an optical layer 123. The optical layer 123 may be referred to as an optical module 123 or an optical unit 123.

The optical sheet 125 may allow light from the light source to be evenly transmitted to the display panel 110. The optical sheet 125 may be composed of a plurality of layers. For example, the optical sheet 125 may include a prism sheet, a diffusion sheet, and the like.

The optical sheet 125 may include a coupling part 125d. The coupling part 125d may be coupled to the front cover 105, the frame 130, and/or a back cover 150. Alternatively, the coupling part 125d may be fastened to a structure formed on or coupled to the front cover 105, the frame 130, and/or the back cover 150.

The frame 130 may serve to support components of the display device 100. For example, components, such as the backlight unit 120 and the like, may be coupled to the frame 130. For example, the frame 130 may be made of a metal material, such as an aluminum alloy and the like.

The back cover 150 may be disposed on the rear surface or rear side of the display device 100. The back cover 150 may be coupled to the frame 130 and/or the front cover 105. For example, the back cover 150 may be an injection-molded product made of a resion material.

Figure 3:
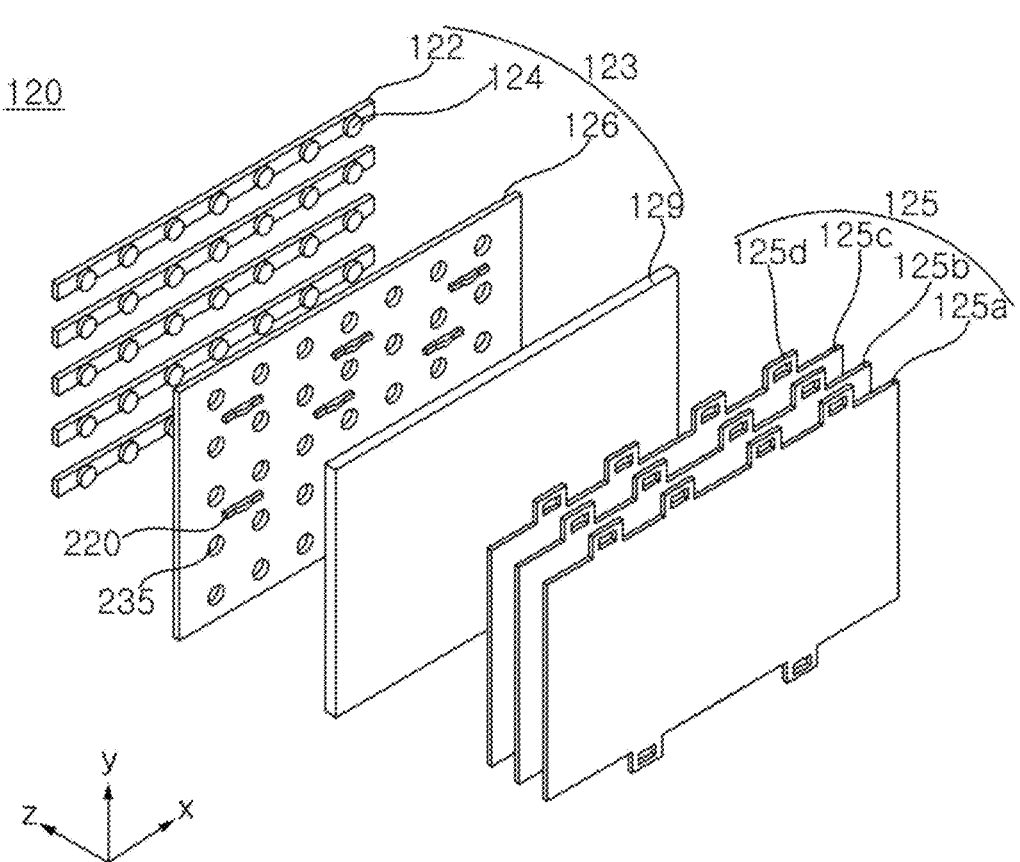

Referring to FIG. 3, a substrate 122 may be formed in the shape of a plurality of straps which extend in a first direction and are spaced apart from each other in a second direction intersecting the first direction.

At least one optical assembly 124 may be mounted on the substrate 122. An electrode pattern for connecting the optical assembly 124 to an adapter may be formed on the substrate 122. For example, a carbon nanotube electrode pattern for connecting the optical assembly 124 to an adapter may be formed on the substrate 122.

The substrate 122 may be made of at least one of polyethylene terephthalate (PET), glass, polycarbonate (PC), and silicon. For example, the substrate 122 may be a printed circuit board (PCB) on which the at least one optical assembly 124 is mounted.

The optical assemblies 124 may be mounted on the substrate 122 at predetermined intervals in the first direction. A diameter of the optical assembly 124 may be greater than a width of the substrate 122. That is, the diameter may be greater than the length of the substrate 122 in the second direction.

The optical assembly 124 may be a light emitting diode (LED) chip or an LED package including at least one LED chip.

The optical assembly 124 may include a light source. The light source may be configured as a white LED or a colored LED emitting at least one color among colors such as red, blue, green, and the like. The colored LED may be a blue LED. For example, the light source may be a mini LED.

A reflective sheet 126 may be disposed on the front surface of the substrate 122. The reflective sheet 126 may be positioned on an area of the substrate 122, excluding the area where the optical assembly 124 is formed. The reflective sheet 126 may have a plurality of holes 235.

The reflective sheet 126 may reflect light, emitted from the optical assembly 124, toward the front side. In addition, the reflective sheet 126 may recycle the light emitted from the optical assembly 124.

The reflective sheet 126 may include at least one of a metal and a metal oxide as a reflective material. For example, the reflective sheet 126 may include a metal having a high reflectance, such as at least one of aluminum (Al), silver (Ag), gold (Au), and titanium dioxide (TiO2), and/or a metal oxide.

Resin may be deposited or coated on the optical assembly 124 and/or the reflective sheet 126. The resin may serve to diffuse light emitted from the optical assembly 124.

An optical layer 129 may include a phosphor. The optical layer 129 may be formed as a plate or a thin sheet. The optical layer 129 may include a red-based phosphor and/or a green-based phosphor. The optical layer 128 may change the wavelength or color of light provided by the optical assembly 124. For example, when the optical assembly 124 provides blue-based light, the optical layer 129 may change the blue-based light to white light. The optical layer 129 may be referred to as a quantum dot (QD) layer or QD sheet.

The optical sheet 125 may be disposed at the front of the optical layer 129. The rear surface of the optical sheet 125 may be in close contact with the optical layer 129, and the front surface of the optical sheet 125 may be in close contact with or adjacent to the rear surface of the display panel 110.

The optical sheet 125 may include at least one or more sheets. More specifically, the optical sheet 125 may include one or more prism sheets and/or one or more diffusion sheets. The plurality of sheets included in the optical sheet 125 may be bonded or closely adhered to each other.

The optical sheet 125 may be composed of a plurality of sheets having different functions. For example, the optical sheet may include first to third optical sheets 125a to 125c. For example, a first optical sheet 125a may be a diffusion sheet, and second and third optical sheets 125b and 125c may be prism sheets. The number and/or position of the diffusion sheet 125a and the prism sheets 125b and 125c may vary.

The diffusion sheet 125a may prevent light, emitted from the optical layer 129, from being partially concentrated, thereby making light distribution uniform. The prism sheets 125b and 125c may collect light emitted from the diffusion sheet 125a and provide the collected light to the display panel 110.

The coupling part 125d may be formed on at least one of the sides or edges of the optical sheet 125. The coupling part 125d may be formed on at least one of the first to third optical sheets 125a to 125c.

The coupling part 125d may be formed on a long side of the optical sheet 125. The coupling part 125d formed on the first long side may be asymmetric to the coupling part 125d formed on the second long side. For example, the position and/or number of the coupling part 125d formed on the first long side and the coupling part 125d formed on the second long side may be different from each other.

Figure 4:
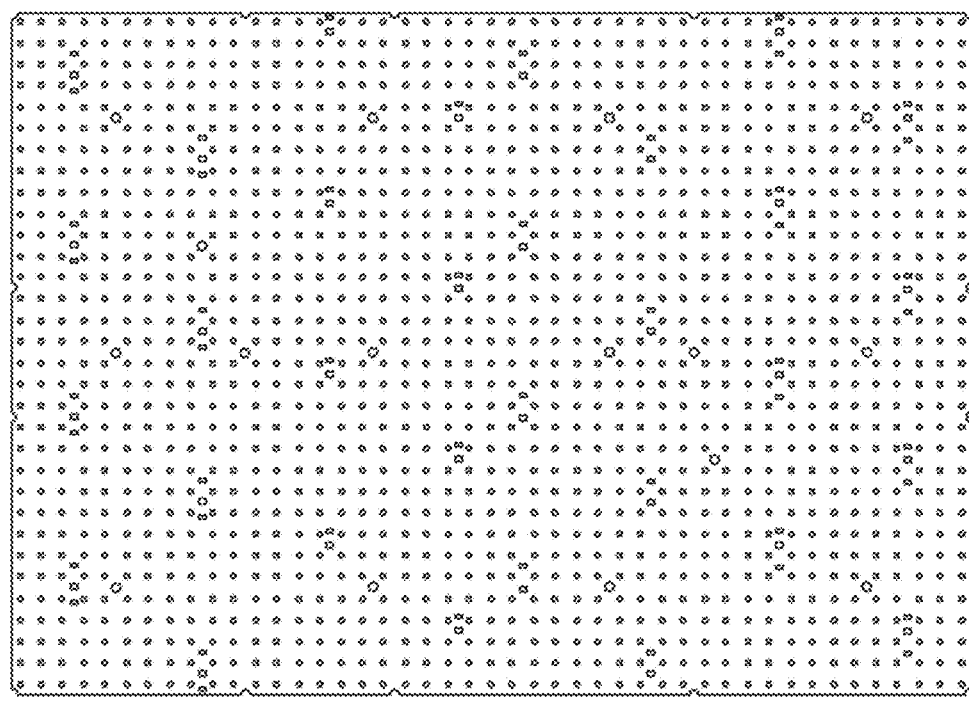
Figure 5:
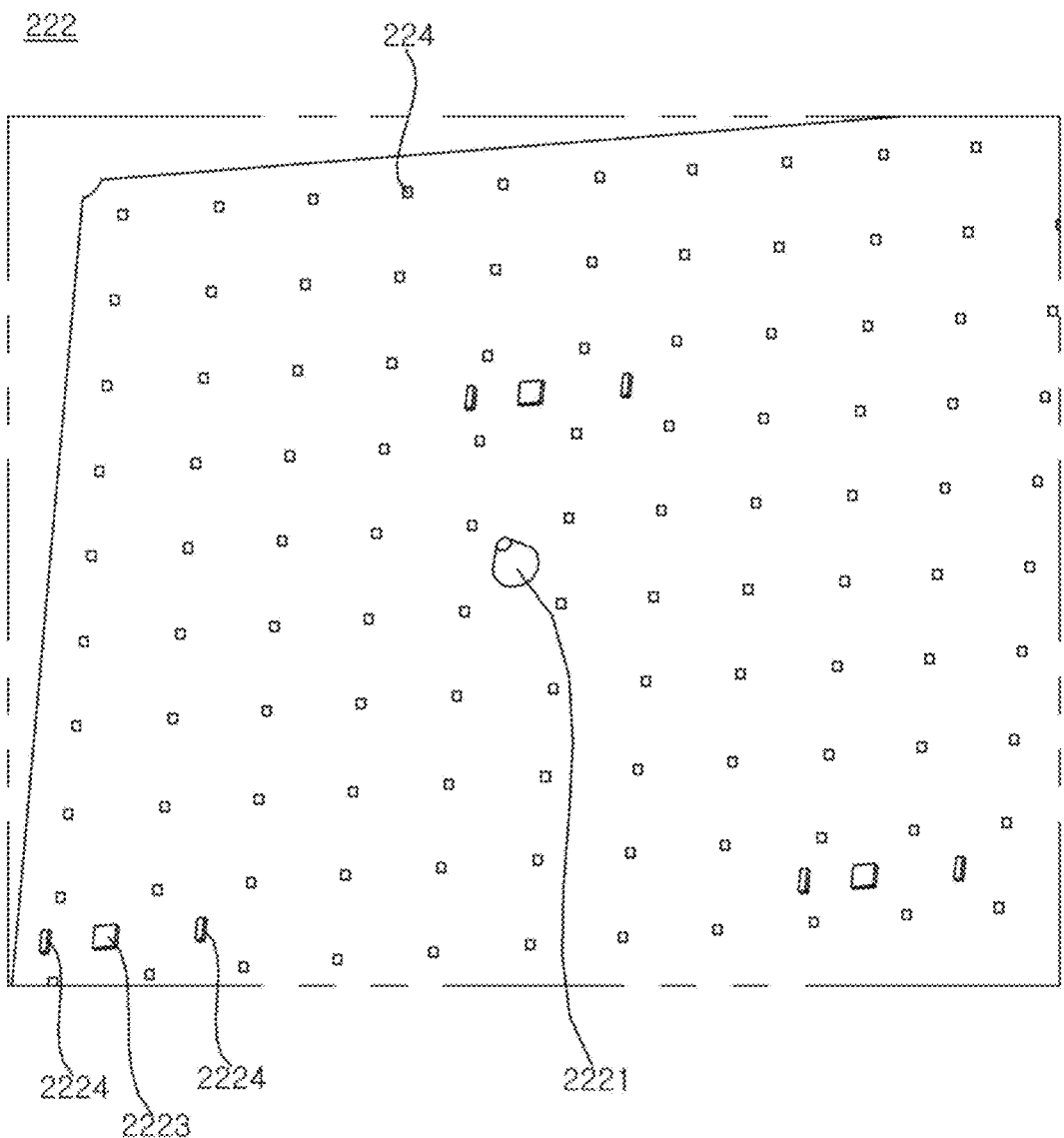

Referring to FIGS. 4 and 5, a substrate 222 may be a plate. The substrate 222 may have a white front surface. A white or reflective material may be applied to the front surface of the substrate 222. An optical assembly 224 may be mounted on the substrate 222. The optical assembly 224 may include a light source and a mini-lens. For example, the light source may be a mini LED providing blue light. A plurality of light sources may be mounted on the substrate 222. The plurality of light sources may be arranged in a plurality of rows and a plurality of columns.

An integrated device 2223 and a capacitor 2224 may be disposed around the light source 224. For example, the integrated device 2223 may be an IC chip 2223. A plurality of capacitors 2224 may be opposite the integrated device 2223. The integrated device 2223 may control power supplied to the plurality of light sources 224 provided in a predetermined number.

A supporter 2221 may be mounted on the substrate 222. The supporter 2221 may maintain a constant distance between the substrate 222 and the aforementioned optical layer 129. The supporter 2221 may have a generally conical shape. The supporter 2221 may be formed by double injection and may be bonded to the substrate 222. The supporter 2221 may be disposed between the optical assemblies 224 and may be fixed onto the substrate 222.

Figure 6:
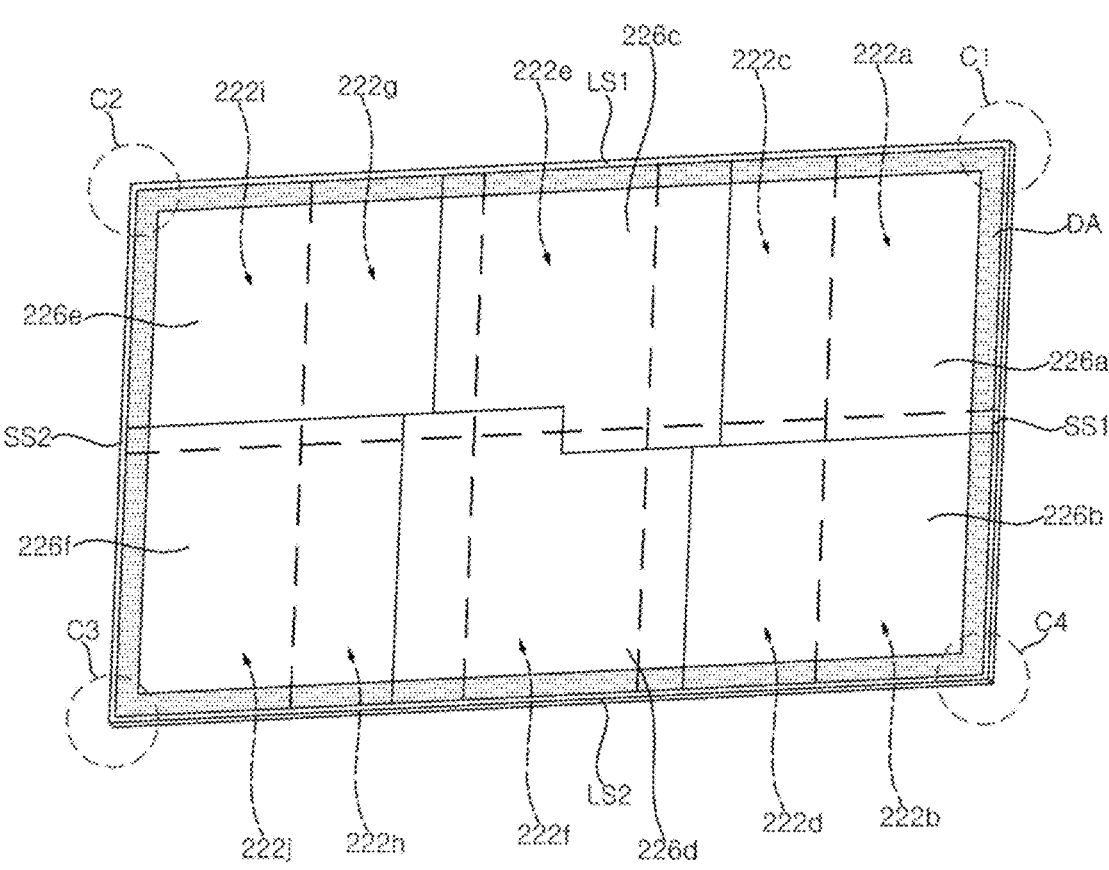

Referring to FIG. 6, there may be a plurality of substrates 222. The plurality of substrates 222 may include a first substrate 222a, a second substrate 222b, a third substrate 222c, a fourth substrate 222d, a fifth substrate 222e, a sixth substrate 222f, a seventh substrate 222g, an eighth substrate 222h, a ninth substrate 222i, and a tenth substrate 222j.

The first substrate 222a may be positioned in contact with the first long side LS1 and the first short side SS1, and may form the first corner C1. The second substrate 222b may be positioned in contact with the first short side SS1 and the second long side LS2, and may form the fourth corner C4. The second substrate 222b may be vertically next to the first substrate 222a.

The ninth substrate 222i may be positioned in contact with the first long side LS1 and the second short side SS2, and may form the second corner C2. The tenth substrate 222j may be positioned in contact with the second short side SS2 and the second long side LS2 and, and may form the third corner C3. The tenth substrate 222j may be vertically next to the ninth substrate 222i.

The fifth substrate 222e may be in contact with the first long side LS1 and may be disposed between the first substrate 222a and the ninth substrate 222i. The sixth substrate 222f may be in contact with the second long side LS2 and may be disposed between the second substrate 222b and the tenth substrate 222j. The sixth substrate 222f may be vertically next to the fifth substrate 222e.

The third substrate 222c may be in contact with the first long side LS1 and may be disposed between the first substrate 222a and the fifth substrate 222e. The fourth substrate 222d may be in contact with the second long side LS2 and may be disposed between the second substrate 222b and the sixth substrate 222f. The fourth substrate 222d may be vertically next to the third substrate 222c.

The seventh substrate 222g may be in contact with the first long side LS1 and may be disposed between the fifth substrate 222e and the ninth substrate 222i. The eighth substrate 222h may be in contact with the second long side LS2 and may be disposed between the sixth substrate 222f and the tenth substrate 222j. The eighth substrate 222h may be vertically next to the seventh substrate 222g.

The reflective sheet 226 may cover the substrate 222. There may be a plurality of reflective sheets 226. The plurality of reflective sheets 226 may cover a plurality of substrates 222. The plurality of reflective sheets 226 may include a first reflective sheet 226a, a second reflective sheet 226b, a third reflective sheet 226c, a fourth reflective sheet 226d, a fifth reflective sheet 226e, and a sixth reflective sheet 226f.

The first reflective sheet 226a may cover the first substrate 222a. The first reflective sheet 226a may overlap the second substate 222b, the third substrate 222c, and the fourth substrate 222d. The second reflective sheet 226b may cover at least a portion or most of the second substrate 222b, and may overlap the fourth substrate 222d.

The third reflective sheet 226c may cover at least a portion or most of the fifth substrate 222e. The third reflective sheet 226c may overlap the third substrate 222c, the fourth substrate 222d, the sixth substrate 222f, and the seventh substrate 222g. The fourth reflective sheet 226d may cover at least a portion or most of the sixth substrate 222f, and may overlap the fourth substrate 222d, the fifth substrate 222e, the sixth substrate 222f, and the seventh substrate 222g.

The fifth reflective sheet 226e may cover at least a portion or most of the ninth substrate 222i, and may overlap the seventh substate 222g. The sixth reflective sheet 226f may cover the tenth substrate 222j. The sixth reflective sheet 226f may overlap the seventh substrate 222g, the eighth substrate 222h, and the ninth substrate 222i.

An area DA or a dot area DA or a pattern area DA may be formed along the first long side LS1, the second long side LS2, the first short side SS1, and/or the second short side SS2.

Figure 7:
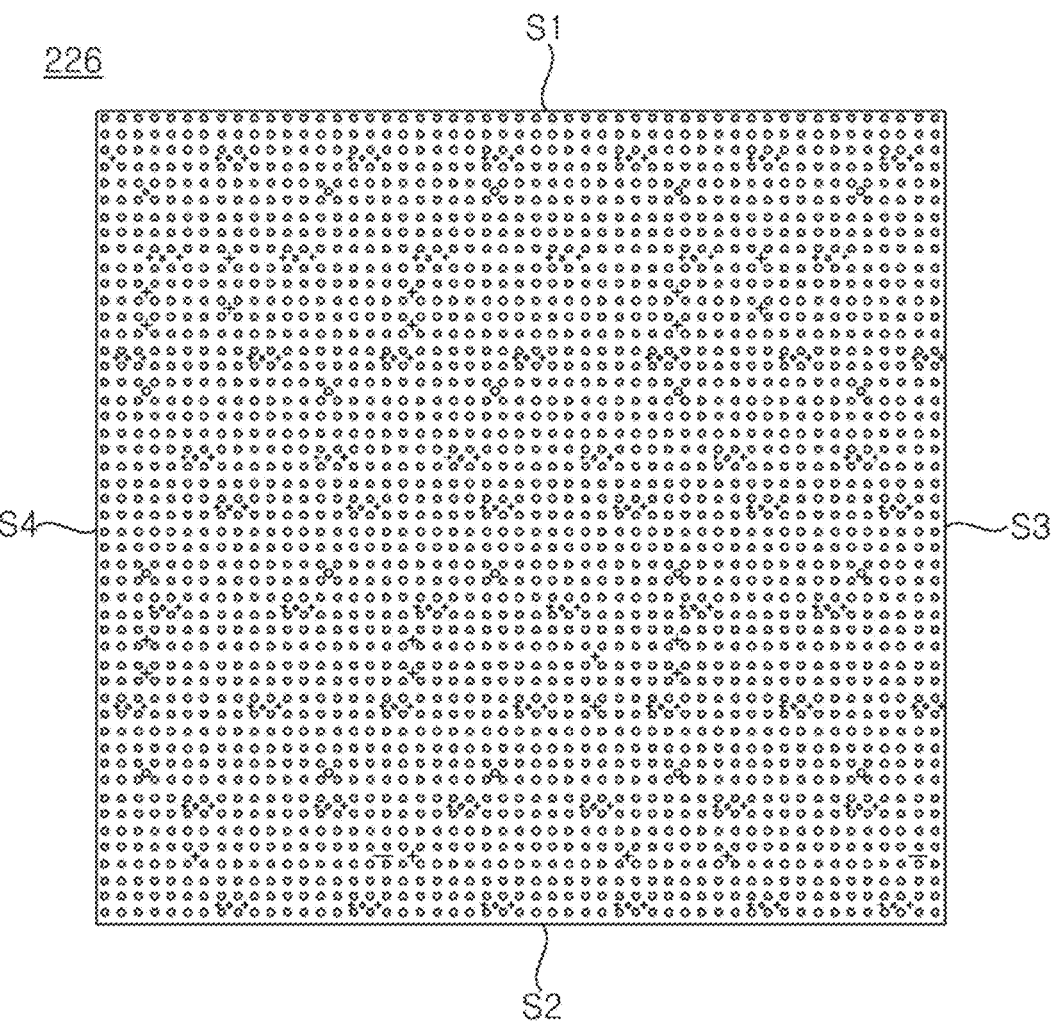
Figure 8:
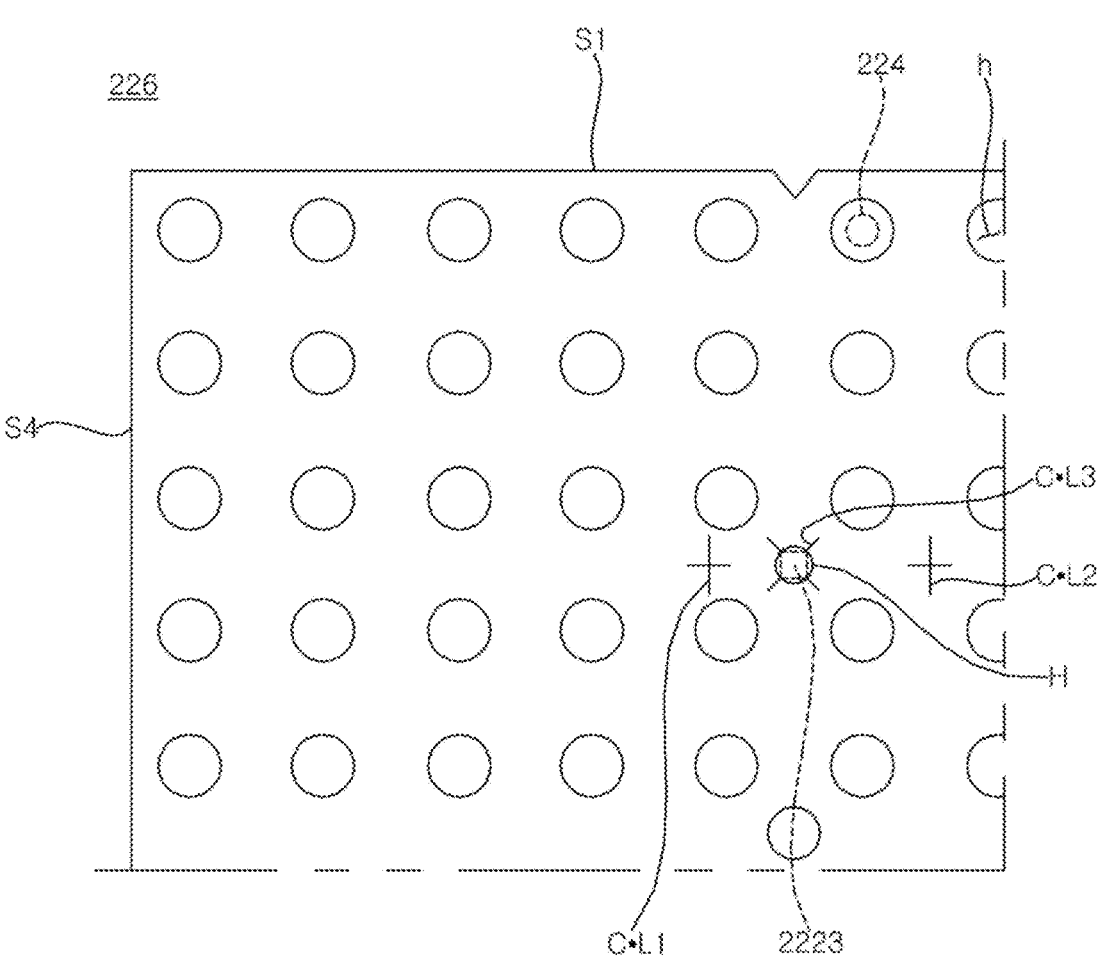

Referring to FIGS. 7 and 8, the reflective sheet 226 may include a first side S1, a second side S2, a third side S3, and a fourth side S4. The side S may be referred to as an edge S.

The reflective sheet 226 may include a plurality of holes h and a plurality of cut-lines CL. The plurality of holes h may be formed corresponding to the light sources 224 and the optical assemblies 224. An area of the hole h may be greater than a transverse cross-sectional area of the optical assembly 224.

The reflective sheet 26 may have an accommodation hole H. A cut-line CL3 may be formed around the accommodation hole H. The cut-line CL3 may be formed in a radial direction of the accommodation hole H. For example, the cut-line CL3 may have a + or cross shape. The accommodation hole H may be referred to as a cut-line hole H. The integrated device 2223 may be disposed in the accommodation hole H. An area of the accommodation hole H may be greater than a cross-sectional area of the integrated device 2223. For example, the accommodation hole H may have a circular shape, and the integrated device 2223 may have a rectangular shape. A portion of the integrated device 2223 may overlap the accommodation hole H, and the cut-line CL around the accommodation hole H may be opened.

The reflective sheet 226 may have a cut-line CL. For example, the cut-line may have a + or cross shape. Cut-lines CL1 and CL2 may be formed between the holes h, and may be disposed adjacent to the accommodation hole H. A first cut-line CL1 may be disposed between the holes h and may be disposed adjacent to the accommodation hole H. A second cut-line CL2 may be opposite the first cut-line CL1 with respect to the accommodation hole H. The accommodation hole H may be disposed between the first cut-line CL1 and the second cut-line CL2. The capacitors 2224 (see FIG. 5) adjacent to the integrated device 2223 may be positioned below the cut-lines CL1 and CL2, and the cut-lines CL1 and CL2 may be opened.

Accordingly, it is possible to prevent the reflective sheet 226 from being separated from the substrate 222 and may improve optical uniformity.

Figure 9:
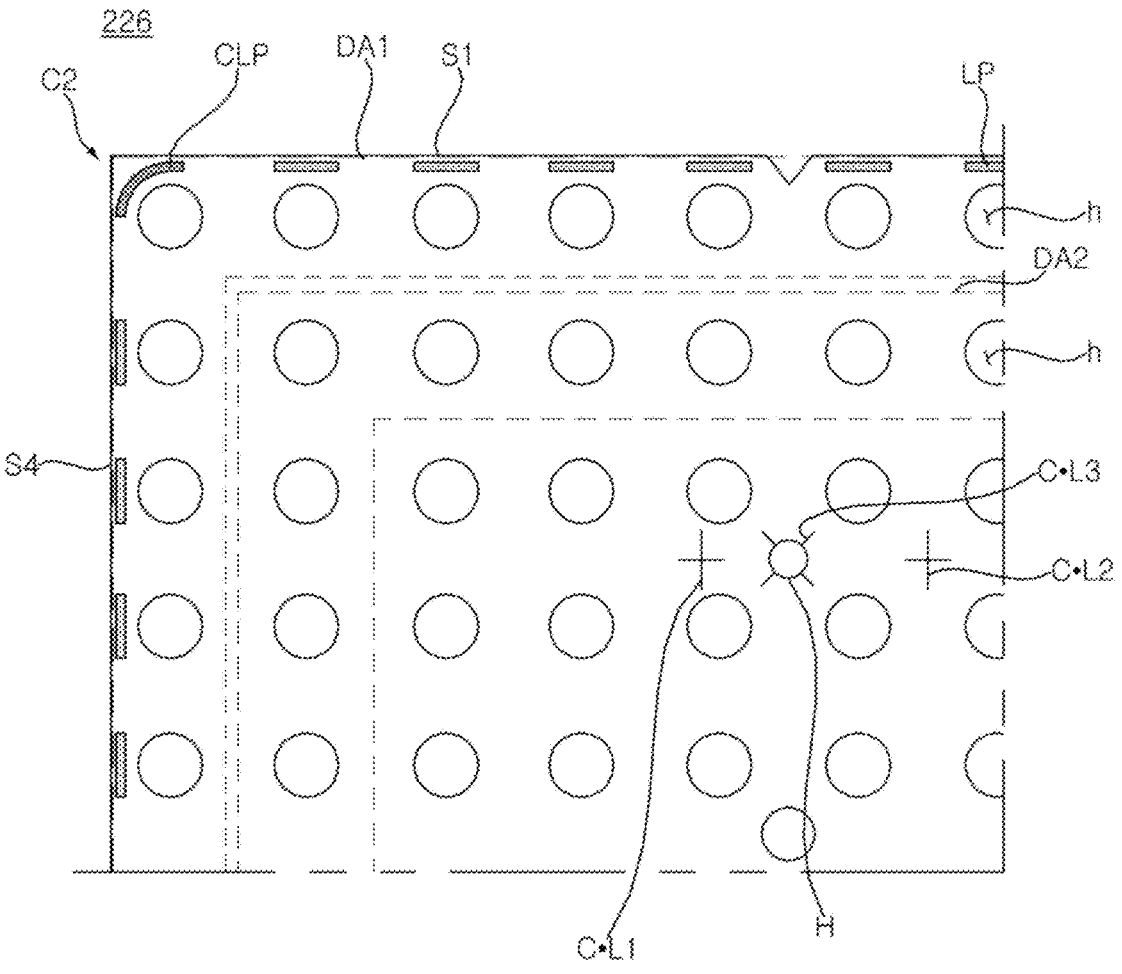

Referring to FIG. 9, the reflective sheet 26 may include a first area DA1 and a second area DA2. The first area DA1 may be referred to as a first dot area DA1 or a first pattern area DA1, and the second area DA2 may be referred to as a second dot area DA2 or a second pattern area DA2.

The first area DA1 may be elongated along the first side S1 and/or the fourth side S4. A first plurality of holes h may be sequentially formed in the first area DA1 at regular intervals. The first area DA1 may be in contact with the first side S1 and/or the fourth side S4. The description of the first side S1 and/or the fourth side S4 may be applied to other sides S2 and S3.

The second area DA2 may be elongated along the first side S1 and/or the fourth side S4. A second plurality of holes h may be sequentially formed in the second area DA2 at regular intervals. The second area DA2 may be in contact with or adjacent to the first area DA1. A distance from the first side S1 and/or the second side S2 to the second area DA2 may be greater than a distance from the first side S1 and/or the fourth side S4 to the first area DA1. The first area DA1 may be positioned between the second area DA2 and the first side S1 and/or the fourth side S4.

The light pattern LP, CLP may include a phosphor. The light pattern LP, CLP may include a red-based phosphor and/or a green-based phosphor. The light pattern LP, CLP may include a yellow-based phosphor.

For example, the light pattern LP, CLP may have a yellow-based color, when viewed with the naked eye. The light pattern LP, CLP may convert blue-based light, provided by the light source 224 (see FIG. 5) or the optical assembly 224, into white light.

In another example, the light pattern LP, CLP may have black or gray-based color, when viewed with the naked eye. The light pattern LP, CLP may absorb light provided by the light source 224 (see FIG. 5) or the optical assembly 224.

The light pattern LP, CLP may be formed in the first area DA1. The light pattern LP, CLP may be formed between the first plurality of holes h and the first side S1 and/or the fourth side S4. The light pattern LP, CLP may include a plurality of segments LP and CLP. The plurality of segments LP and CLP may be an elongated line. Each of the plurality of lines LP may be positioned corresponding to each of the plurality of holes h. For example, the length of the line LP may correspond to the diameter of the hole h. In another example, the length of the line LP may be smaller than the diameter of the hole h. In another example, the length of the line LP may be greater than the diameter of the hole h.

A corner line CLP may extend while being curved and may have a fan shape or a semi-circular shape. For example, the corner line CLP may be a quarter circle. The corner line CLP may be positioned between a hole h, disposed closest to the second corner C2, and the second corner C2. The description of the second corner C2 may also be applied to other corners C1, C3, and C4.

Figure 10:
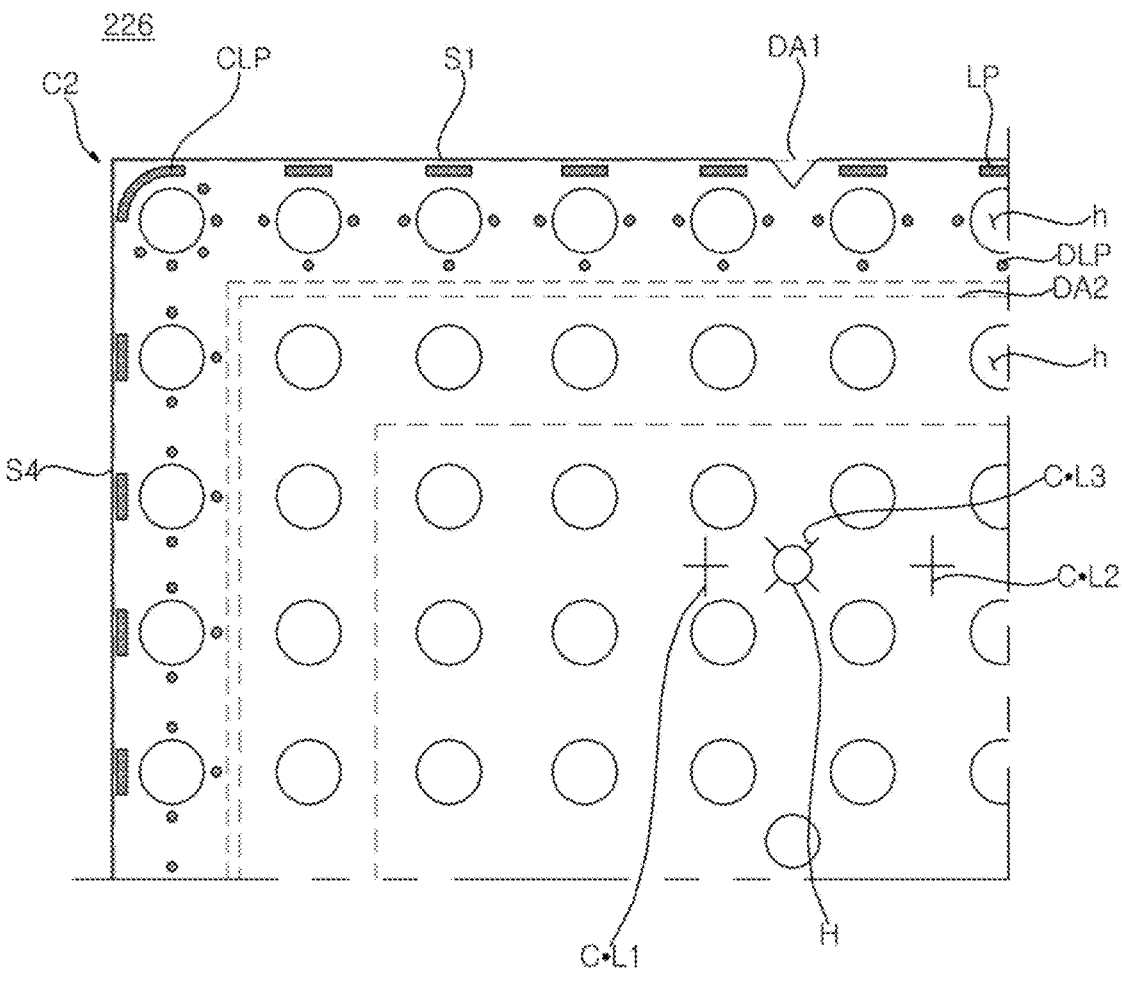

Referring to FIG. 10, the reflective sheet 226 may include a first area DA1 and a second area DA2. The first area DA1 may be referred to as a first dot area DA1 or a first pattern area DA1, and the second area DA2 may be referred to as a second dot area DA2 or a second pattern area DA2.

The first area DA1 may be elongated along the first side S1 and/or the fourth side S4. A first plurality of holes h may be sequentially formed in the first area DA1 at regular intervals. The first area DA1 may be in contact with the first side S1 and/or the fourth side S4. The description of the first side S1 and/or the fourth side S4 may be applied to other sides S2 and S3.

The second area DA2 may be elongated along the first side S1 and/or the fourth side S4. A second plurality of holes h may be sequentially formed in the second area DA2 at regular intervals. The second area DA2 may be in contact with or adjacent to the first area DA1. A distance from the first side S1 and/or the fourth side S4 to the second area DA2 may be greater than a distance from the first side S1 and/or the fourth side S4 to the first area DA1. The first area DA1 may be positioned between the second area DA2 and the first side S1 and/or the fourth side S4.

The light pattern LP, CLP, DLP may include a phosphor. The light pattern LP, CLP, DLP may include a red-based phosphor and a green-based phosphor. The light pattern LP, CLP, DLP may include a yellow-based phosphor.

For example, the light pattern LP, CLP, DLP may have a yellow-based color, when viewed with the naked eye. The light pattern LP, CLP, DLP may convert blue-based light, provided by the light source 224 (see FIG. 5) or the optical assembly 224, into white light.

In another example, the light pattern LP, CLP, DLP may have black or gray-based color, when viewed with the naked eye. The light pattern LP, CLP, DLP may absorb light provided by the light source 224 (see FIG. 5) or the optical assembly 224.

The light pattern LP, CLP, DLP may be formed in the first area DA1. The light pattern LP, CLP, DLP may be formed between the first plurality of holes h and the first side S1 and/or the fourth side S4.

The light pattern LP, CLP, DLP may include a plurality of segments LP. The plurality of segments LP may be an elongated line. Each of the plurality of lines LP may be positioned corresponding to each of the plurality of holes h.

For example, the length of the line LP may correspond to the diameter of the hole h. In another example, the length of the line LP may be smaller than the diameter of the hole h. In another example, the length of the line LP may be greater than the diameter of the hole h.

The light pattern DLP may include dots DLP. The dots DLP may be disposed around the hole h. For example, the dots DLP may be three in number. The line LP and the dot DLP may be disposed to surround the hole h. Two dots DLP may be positioned opposite each other with respect to the hole h, and one dot DLP may be positioned opposite the line LP with respect to the hole h.

The light pattern CLP may include a corner line CLP. The corner line CLP may extend while being curved and may have a fan shape or a semi-circular shape. For example, the corner line CLP may be a quarter circle. The corner line CLP may be positioned between a hole h, disposed closest to the second corner C2, and the second corner C2. The corner line CLP may be referred to as a curved line CLP. The dots DLP may be disposed around the hole h that is closest to the second corner C2. For example, the dots DLP may be five in number. The five dots DLP may be sequentially disposed around the hole h that is closest to the second corner C2 together with the corner line CLP. The dots DLP may be opposite the corner line CLP with respect to the hole h. The description of the second corner C2 may be applied to other corners C1, C3, and C4.

Figure 11:
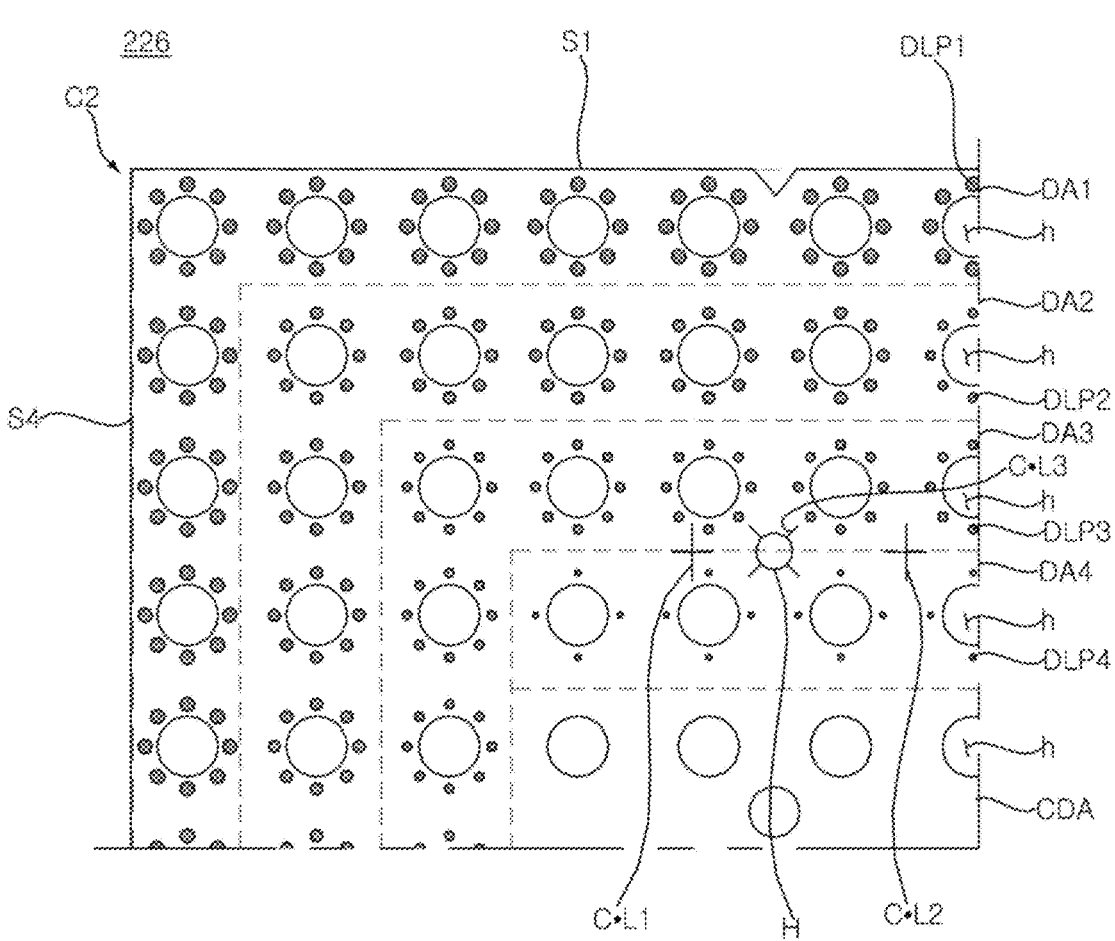

Referring to FIG. 11, the reflective sheet 226 may include a first area DA1, a second area DA2, a third area DA3, a fourth area DA4, and a central area CDA. The area DA may be referred to as a dot area DA.

The first area DA1 may be elongated along the first side S1 and/or the fourth side S4. A first plurality of holes h may be sequentially formed in the first area DA1 at regular intervals. The first area DA1 may be in contact with the first side S1 and/or the fourth side S4. The description of the first side S1 and/or the fourth side S4 may be applied to other sides S2 and S3.

The second area DA2 may be elongated along the first side S1 and/or the fourth side S4. A second plurality of holes h may be sequentially formed in the second area DA2 at regular intervals. The second area DA2 may be in contact with or next to the first area DA1. A distance from the first side S1 and/or the fourth side S4 to the second area DA2 may be greater than a distance from the first side S1 and/or the fourth side S4 to the first area DA1. The first area DA1 may be positioned between the second area DA2 and the first side S1 and/or the fourth side S4.

The third area DA3 may be elongated along the first side S1 and/or the fourth side S4. A third plurality of holes h may be sequentially formed in the third area DA3 at regular intervals. The third area DA3 may be in contact with or next to the second area DA2. A distance from the first side S1 and/or the fourth side S4 to the third area DA3 may be greater than a distance from the first side S1 and/or the fourth side S4 to the second area DA2. The second area DA2 may be positioned between the third area DA3 and the first area DA1.

The fourth area DA4 may be elongated along the first side S1. A fourth plurality of holes h may be sequentially formed in the fourth area DA4 at regular intervals. The fourth area DA4 may be in contact with or next to the third area DA3. A distance from the first side S1 and/or the fourth side S4 to the fourth area DA4 may be greater than a distance from the first side S1 and/or the fourth side S4 to the third area DA3. The third area DA3 may be positioned between the fourth area DA4 and the second area DA2.

The central area CDA may be an area of the reflective sheet 226 excluding the first area DA1, the second area DA2, the third area DA3, and the fourth area DA4.

The light pattern DLP may include a phosphor. The light pattern DLP may include a red-based phosphor and a green-based phosphor. The light pattern DLP may include a yellow-based phosphor.

For example, the light pattern DLP may have a yellow-based color, when viewed with the naked eye. The light pattern DLP may convert blue-based light, provided by the light source 224 (see FIG. 5) or the optical assembly 224, into white light.

In another example, the light pattern DLP may have black or gray-based color, when viewed with the naked eye. The light pattern DLP may absorb light provided by the light source 224 (see FIG. 5) or the optical assembly 224.

The light pattern DLP may include dots DLP. The dots DLP may be disposed around the hole h. The dots DLP may be disposed to surround the hole h.

First dots DLP1 may be disposed around at least one hole h among the first plurality of holes h. For example, the first dots DLP1 may be eight in number, and the eight first dots DLP1 may be sequentially arranged around the hole h at regular intervals.

Second dots DLP2 may be disposed around at least one hole h among the second plurality of holes h. For example, the second dots DLP2 may be eight in number, and the eight second dots DLP1 may be sequentially arranged around the hole h at regular intervals.

Third dots DLP3 may be disposed around at least one hole h among the third plurality of holes h. For example, the third dots DLP3 may be eight in number, and the eight third dots DLP1 may be sequentially arranged around the hole h at regular intervals.

Fourth dots DLP4 may be disposed around at least one hole h among the fourth plurality of holes h. For example, the fourth dots DLP4 may be three or four in number, and the four fourth dots DLP4 may be sequentially arranged around the hole h at regular intervals. The dots DLP4 around the hole h that is adjacent to the cut-line CL1 may be three in number. The dots DLP4 may be excluded from an area adjacent to the cut-line CL1 around the hole h.

For example, the size of the first dot DLP1 may be greater than the size of the second dot DLP2. The size of the second dot DLP2 may be greater than the size of the third dot DLP3. The size of the third dot DLP3 may be greater than the size of the fourth dot DLP4. In another example, the first dot DLP1, the second dot DLP2, the third dot DLP3, and the fourth dot DLP4 may have the same size. In the case where the dots DLP have the same size, the number of the dots DLP may increase.

The description of the second corner C2 may be applied to other corners C1, C3, and C4.

Figure 12:
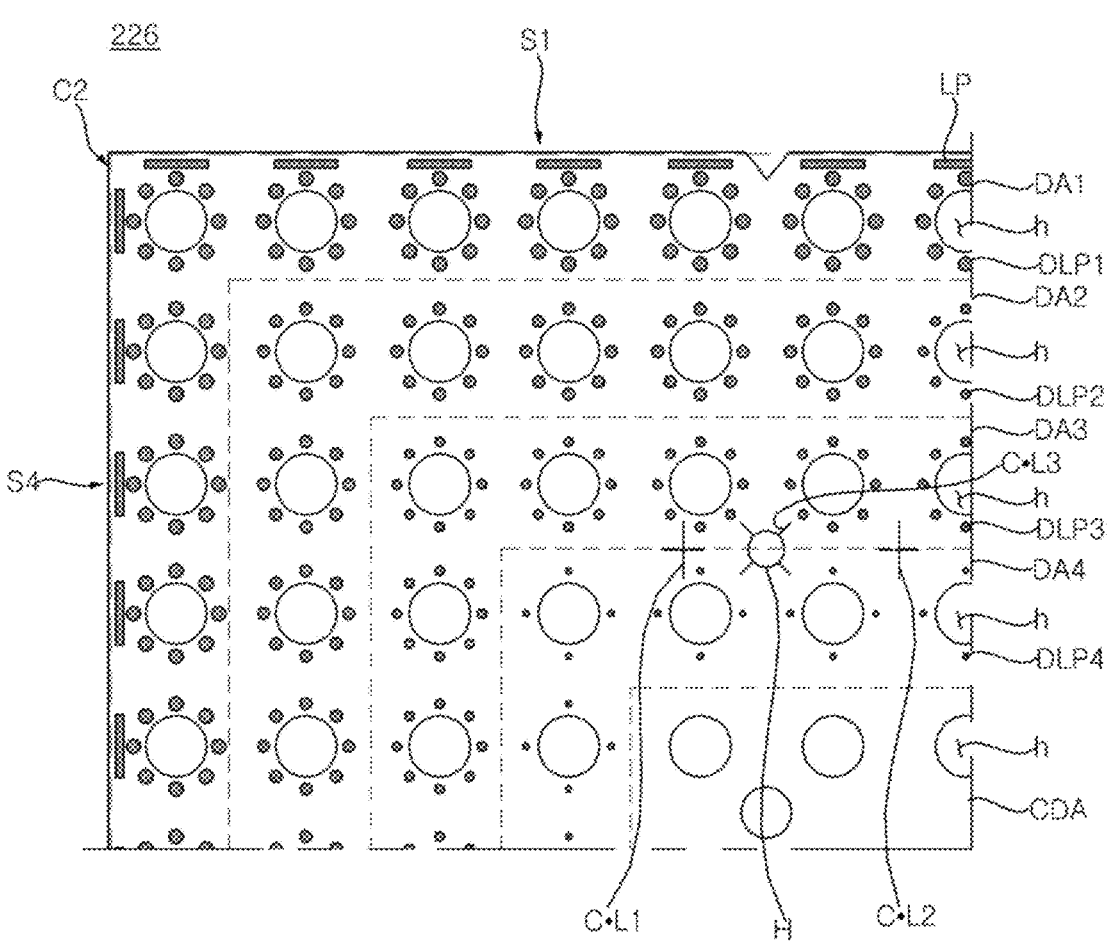

Referring to FIG. 12, the reflective sheet 226 may include a first area DA1, a second area DA2, a third area DA3, a fourth area DA4, and a central area CDA. The area DA may be referred to as a dot area DA or a pattern area DA.

The first area DA1 may be elongated along the first side S1 and/or the fourth side S4. A first plurality of holes h may be sequentially formed in the first area DA1 at regular intervals. The first area DA1 may be in contact with the first side S1 and/or the fourth side S4. The description of the first side S1 and/or the fourth side S4 may be applied to other sides S2 and S3.

The second area DA2 may be elongated along the first side S1 and/or the fourth side S4. A second plurality of holes h may be sequentially formed in the second area DA2 at regular intervals. The second area DA2 may be in contact with or next to the first area DA1. A distance from the first side S1 and/or the fourth side S4 to the second area DA2 may be greater than a distance from the first side S1 and/or the fourth side S4 to the first area DA1. The first area DA1 may be positioned between the second area DA2 and the first side S1 and/or the fourth side S4.

The third area DA3 may be elongated along the first side S1 and/or the fourth side S4. A third plurality of holes h may be sequentially formed in the third area DA3 at regular intervals. The third area DA3 may be in contact with or next to the second area DA2. A distance from the first side S1 and/or the fourth side S4 to the third area DA3 may be greater than a distance from the first side S1 and/or the fourth side S4 to the second area DA2. The second area DA2 may be positioned between the third area DA3 and the first area DA1.

The fourth area DA4 may be elongated along the first side S1 and/or the fourth side S4. A fourth plurality of holes h may be sequentially formed in the fourth area DA4 at regular intervals. The fourth area DA4 may be in contact with or next to the third area DA3. A distance from the first side S1 and/or the fourth side S4 to the fourth area DA4 may be greater than a distance from the first side S1 and/or the fourth side S4 to the third area DA3. The third area DA3 may be positioned between the fourth area DA4 and the second area DA2.

The central area CDA may be an area of the reflective sheet 226 excluding the first area DA1, the second area DA2, the third area DA3, and the fourth area DA4.

The light pattern DLP, LP may include a phosphor. The light pattern DLP, LP may include a red-based phosphor and a green-based phosphor. The light pattern DLP, LP may include a yellow-based phosphor.

For example, the light pattern DLP, LP may have a yellow-based color, when viewed with the naked eye. The light pattern DLP, LP may convert blue-based light, provided by the light source 224 (see FIG. 5) or the optical assembly 224, into white light.

In another example, the light pattern DLP, LP may have black or gray-based color, when viewed with the naked eye. The light pattern DLP, LP may absorb light provided by the light source 224 (see FIG. 5) or the optical assembly 224.

The light pattern DLP may include dots DLP. The dots DLP may be disposed around the hole h. The dots DLP may be disposed to surround the hole h.

First dots DLP1 may be disposed around at least one hole h among the first plurality of holes h. For example, the first dots DLP1 may be eight in number, and the eight first dots DLP1 may be sequentially arranged around the hole h at regular intervals.

Second dots DLP2 may be disposed around at least one hole h among the second plurality of holes h. For example, the second dots DLP2 may be eight in number, and the eight second dots DLP2 may be sequentially arranged around the hole h at regular intervals.

Third dots DLP3 may be disposed around at least one hole h among the third plurality of holes h. For example, the third dots DLP3 may be eight in number, and the eight third dots DLP3 may be sequentially arranged around the hole h at regular intervals.

Fourth dots DLP4 may be disposed around at least one hole h among the fourth plurality of holes h. For example, the fourth dots DLP4 may be three or four in number, and the four fourth dots DLP4 may be sequentially arranged around the hole h at regular intervals. The dots DLP4 around the hole h that is adjacent to the cut-line CL1 may be three in number. The dots DLP4 may be excluded from an area adjacent to the cut-line CL1 around the hole h.

For example, the size of the first dot DLP1 may be greater than the size of the second dot DLP2. The size of the second dot DLP2 may be greater than the size of the third dot DLP3. The size of the third dot DLP3 may be greater than the size of the fourth dot DLP4. In another example, the first dot DLP1, the second dot DLP2, the third dot DLP3, and the fourth dot DLP4 may have the same size. In the case where the dots DLP have the same size, the number of the dots DLP may increase.

The light pattern LP may include a plurality of segments LP. The plurality of segments LP may be an elongated line. Each of the plurality of lines LP may be positioned corresponding to each of the plurality of holes h. The plurality of lines LP may be disposed between the first plurality of holes h and the first side S1 and/or the fourth side S4. The plurality of lines LP may be disposed between the first dots DA1 and the first side S1 and/or the fourth side S4.

For example, the length of the line LP may correspond to the diameter of the hole h. In another example, the length of the line LP may be smaller than the diameter of the hole h. In another example, the length of the line LP may be greater than the diameter of the hole h.

The description of the second corner C2 may be applied to other corners C1, C3, and C4.

Figure 13:
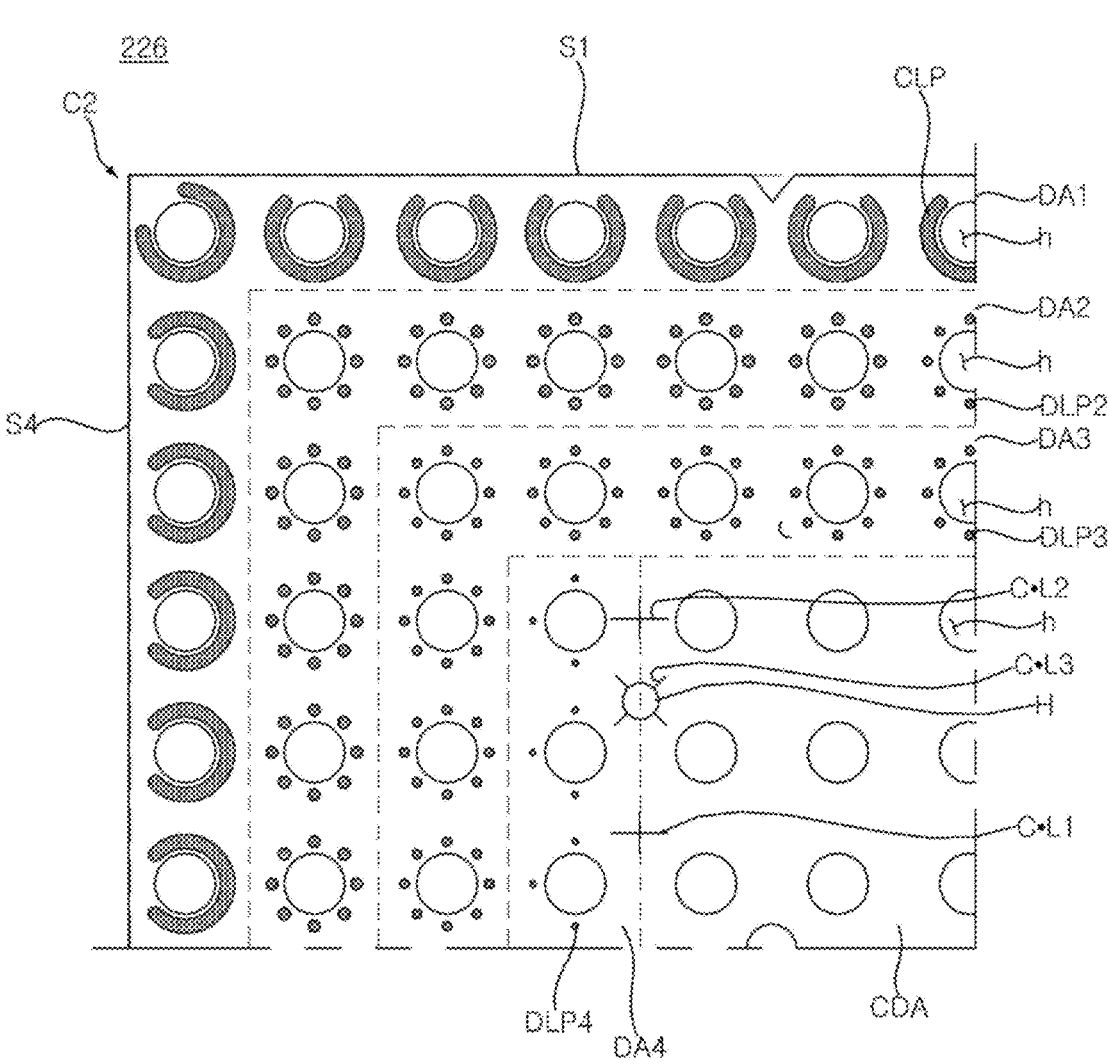

Referring to FIG. 13, the reflective sheet 226 may include a first area DA1, a second area DA2, a third area DA3, a fourth area DA4, and a central area CDA. The area DA may be referred to as a dot area DA or a pattern area DA.

The first area DA1 may be elongated along the first side S1 and/or the fourth side S4. A first plurality of holes h may be sequentially formed in the first area DA1 at regular intervals. The first area DA1 may be in contact with the first side S1 and/or the fourth side S4. The description of the first side S1 and/or the fourth side S4 may be applied to other sides S2 and S3.

The second area DA2 may be elongated along the first side S1 and/or the fourth side S4. A second plurality of holes h may be sequentially formed in the second area DA2 at regular intervals. The second area DA2 may be in contact with or next to the first area DA1. A distance from the first side S1 and/or the fourth side S4 to the second area DA2 may be greater than a distance from the first side S1 and/or the fourth side S4 to the first area DA1. The first area DA1 may be positioned between the second area DA2 and the first side S1 and/or the fourth side S4.

The third area DA3 may be elongated along the first side S1 and/or the fourth side S4. A third plurality of holes h may be sequentially formed in the third area DA3 at regular intervals. The third area DA3 may be in contact with or next to the second area DA2. A distance from the first side S1 and/or the fourth side S4 to the third area DA3 may be greater than a distance from the first side S1 and/or the fourth side S4 to the second area DA2. The second area DA2 may be positioned between the third area DA3 and the first area DA1.

The fourth area DA4 may be elongated along the fourth side S4. A fourth plurality of holes h may be sequentially formed in the fourth area DA4 at regular intervals. The fourth area DA4 may be in contact with or next to the third area DA3. A distance from the first side S1 and/or the fourth side S4 to the fourth area DA4 may be greater than a distance from the first side S1 and/or the fourth side S4 to the third area DA3. The third area DA3 may be positioned between the fourth area DA4 and the second area DA2.

The central area CDA may be an area of the reflective sheet 226 excluding the first area DA1, the second area DA2, the third area DA3, and the fourth area DA4.

The light pattern DLP, CLP may include a phosphor. The light pattern DLP, CLP may include a red-based phosphor and a green-based phosphor. The light pattern DLP, CLP may include a yellow-based phosphor.

For example, the light pattern DLP, CLP may have a yellow-based color, when viewed with the naked eye. The light pattern DLP, CLP may convert blue-based light, provided by the light source 224 (see FIG. 5) or the optical assembly 224, into white light.

In another example, the light pattern DLP, CLP may have black or gray-based color, when viewed with the naked eye. The light pattern DLP, CLP may absorb light provided by the light source 224 (see FIG. 5) or the optical assembly 224.

The light pattern DLP may include dots DLP. The dots DLP may be disposed around the hole h. The dots DLP may be disposed to surround the hole h.

The curved line CLP may be disposed around at least one hole h among the first plurality of holes h. The curved line CLP may have a generally ring shape. The curved line CLP may be elongated along an outer circumference of the hole h. A portion of the curved line CLP may be opened. The open portion of the curved line CLP may face the first side S1 or the fourth side S4.

Second dots DLP2 may be disposed around at least one hole h among the second plurality of holes h. For example, the second dots DLP2 may be eight in number, and the eight second dots DLP2 may be sequentially arranged around the hole h at regular intervals.

Third dots DLP3 may be disposed around at least one hole h among the third plurality of holes h. For example, the third dots DLP3 may be eight in number, and the eight third dots DLP3 may be sequentially arranged around the hole h at regular intervals.

Fourth dots DLP4 may be disposed around at least one hole h among the fourth plurality of holes h. For example, the fourth dots DLP4 may be three or four in number, and the four fourth dots DLP4 may be sequentially arranged around the hole h at regular intervals. The dots DLP4 around the hole h that is adjacent to the cut line CL1, CL2, CL3 may be three in number. The dots DLP4 may be excluded from an area adjacent to the cut line CL1, CL2, CL3 around the hole h.

For example, the size of the second dot DLP2 may be greater than the size of the third dot DLP3. The size of the third dot DLP3 may be greater than the size of the fourth dot DLP4. In another example, the second dot DLP2, the third dot DLP3, and the fourth dot DLP4 may have the same size. In the case where the dots DLP have the same size, the number of the dots DLP may increase.

The description of the second corner C2 may be applied to other corners C1, C3, and C4.

Figure 14:
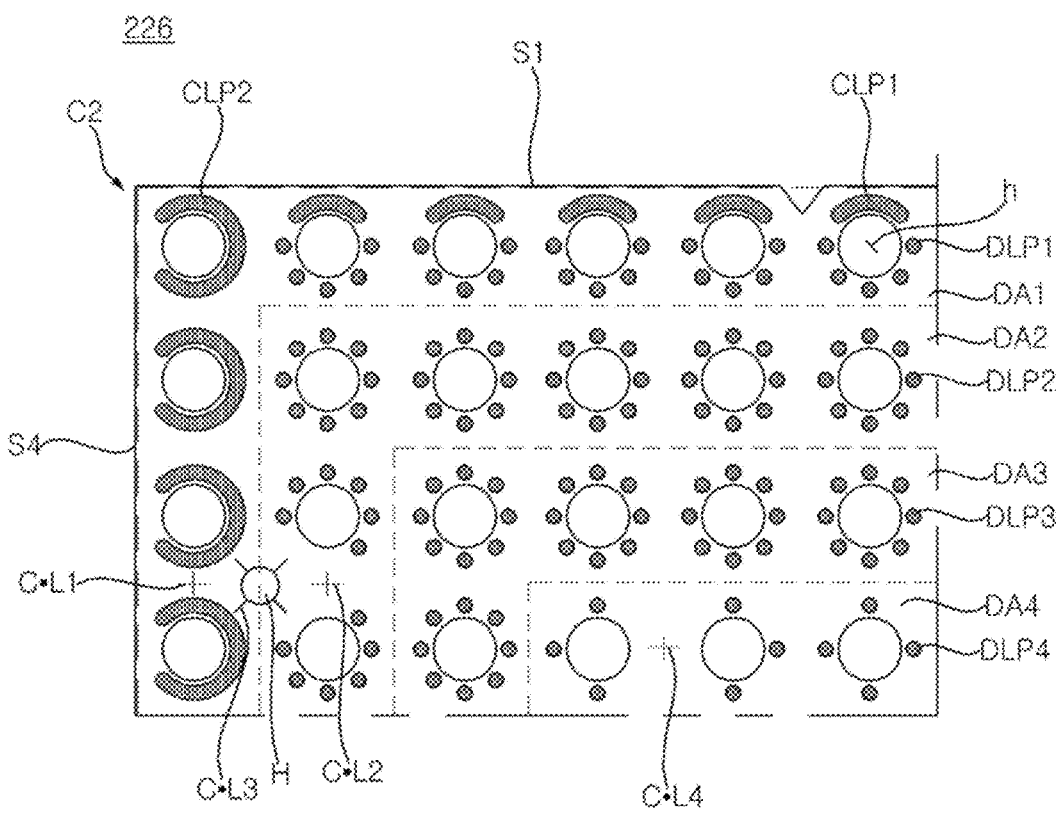

Referring to FIG. 14, the reflective sheet 226 may include a first area DA1, a second area DA2, a third area DA3, and a fourth area DA4. The area DA may be referred to as a dot area DA or a pattern area DA.

The first area DA1 may be elongated along the first side S1 and/or the fourth side S4. A first plurality of holes h may be sequentially formed in the first area DA1 at regular intervals. The first area DA1 may be in contact with the first side S1 and/or the fourth side S4. The description of the first side S1 and/or the fourth side S4 may be applied to other sides S2 and S3 (see FIG. 7).

The second area DA2 may be elongated along the first side S1 and/or the fourth side S4. A second plurality of holes h may be sequentially formed in the second area DA2 at regular intervals. The second area DA2 may be in contact with or next to the first area DA1. A distance from the first side S1 and/or the fourth side S4 to the second area DA2 may be greater than a distance from the first side S1 and/or the fourth side S4 to the first area DA1. The first area DA1 may be positioned between the second area DA2 and the first side S1 and/or the fourth side S4.

The third area DA3 may be elongated along the first side S1 and/or the fourth side S4. A third plurality of holes h may be sequentially formed in the third area DA3 at regular intervals. The third area DA3 may be in contact with or next to the second area DA2. A distance from the first side S1 and/or the fourth side S4 to the third area DA3 may be greater than a distance from the first side S1 and/or the fourth side S4 to the second area DA2. The second area DA2 may be positioned between the third area DA3 and the first area DA1.

The fourth area DA4 may be elongated along the first side S1. A fourth plurality of holes h may be sequentially formed in the fourth area DA4 at regular intervals. The fourth area DA4 may be in contact with or next to the third area DA3. A distance from the first side S1 and/or the fourth side S4 to the fourth area DA4 may be greater than a distance from the first side S1 and/or the fourth side S4 to the third area DA3. The third area DA3 may be positioned between the fourth area DA4 and the second area DA2.

The light pattern DLP, CLP may include a phosphor. The light pattern DLP, CLP may include a red-based phosphor and a green-based phosphor. The light pattern DLP, CLP may include a yellow-based phosphor.

For example, the light pattern DLP, CLP may have a yellow-based color, when viewed with the naked eye. The light pattern DLP, CLP may convert blue-based light, provided by the light source 224 (see FIG. 5) or the optical assembly 224, into white light.

In another example, the light pattern DLP, CLP may have black or gray-based color, when viewed with the naked eye. The light pattern DLP, CLP may absorb light provided by the light source 224 (see FIG. 5) or the optical assembly 224.

The light pattern DLP may include dots DLP. The dots DLP may be disposed around the hole h. The dots DLP may be disposed to surround the hole h.

The curved line CLP may be disposed around at least one hole h among the first plurality of holes h. The curved line CLP may have a generally ring shape, or a semi-circular shape or a fan shape. The curved line CLP may be elongated in an arc along an outer circumference of the hole h. A portion of the curved line CLP may be opened. The open portion of the curved line CLP may face the fourth side S4. The curved line CLP may be formed next to the first side S1.

In the hole h that is next to the first side S1, a curved line CLP1 may be positioned between the hole h and the first side S1. The dots DLP1 may be opposite the curved line CLP1 with respect to the hole h. For example, the arc formed by the dots DLP1 may be larger than an arc formed by the curved line CLP1. In another example, five dots DLP1 may be arranged around the hole h, and the curved line CLP1 may be disposed in a remaining area. The curvature of the arc formed by the five dots DLP1 may be equal to the curvature of the arc formed by the curved line CLP1.

In the hole h that is next to the fourth side S4, a curved line CLP2 may be positioned around the hole h, and an open portion of the curved line CLP2 may face the fourth side S4. A width of the curved line CLP2 that is next to the fourth side S4 may be substantially equal to a width of the curved line CLP1 that is next to the first side S1.

Second dots DLP2 may be disposed around at least one hole h among the second plurality of holes h. For example, the second dots DLP2 may be eight in number, and the eight second dots DLP2 may be sequentially arranged around the hole h at regular intervals. The dots DLP2 around the hole h that is adjacent to the cut-line CL2 may be six in number. The dots DLP2 may be excluded from an area that is adjacent to the cut-line CL2 around the hole h.

Third dots DLP3 may be disposed around at least one hole h among the third plurality of holes h. For example, the third dots DLP3 may be eight in number, and the eight third dots DLP3 may be sequentially arranged around the hole h at regular intervals.

Fourth dots DLP4 may be disposed around at least one hole h among the fourth plurality of holes h. For example, the fourth dots DLP4 may be three or four in number, and the four fourth dots DLP4 may be sequentially arranged around the hole h at regular intervals. The dots DLP4 around the hole h that is adjacent to the cut-line CL4 may be three in number. The dots DLP4 may be excluded from an area adjacent to the cut-line CL4 around the hole h.

For example, the size of the second dot DLP2 may be greater than the size of the third dot DLP3. The size of the third dot DLP3 may be greater than the size of the fourth dot DLP4. In another example, the second dot DLP2, the third dot DLP3, and the fourth dot DLP4 may have the same size. In the case where the dots DLP have the same size, the number of the dots DLP may increase.

The description of the second corner C2 may be applied to other corners C1, C3, and C4.

Figure 15:
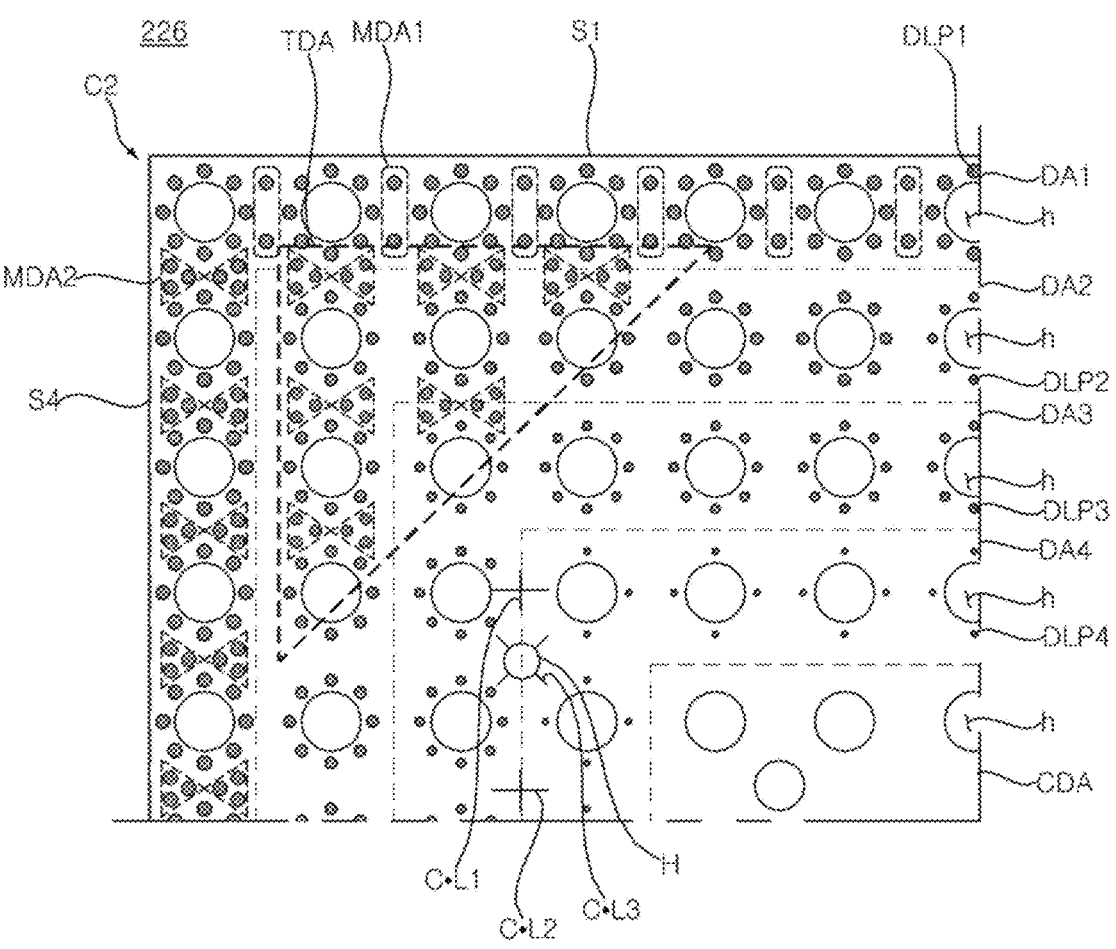

Referring to FIG. 15, the reflective sheet 226 may include a first area DA1, a second area DA2, a third area DA3, a fourth area DA4, a central area CDA, an intermediate area MDA1, MDA2, and a triangular area TDA. The area DA may be referred to as a dot area DA or a pattern area DA.

The first area DA1 may be elongated along the first side S1 and/or the fourth side S4. A first plurality of holes h may be sequentially formed in the first area DA1 at regular intervals. The first area DA1 may be in contact with the first side S1 and/or the fourth side S4. The description of the first side S1 and/or the fourth side S4 may be applied to other sides S2 and S3 (see FIG. 7).

The second area DA2 may be elongated along the first side S1 and/or the fourth side S4. A second plurality of holes h may be sequentially formed in the second area DA2 at regular intervals. The second area DA2 may be in contact with or next to the first area DA1. A distance from the first side S1 and/or the fourth side S4 to the second area DA2 may be greater than a distance from the first side S1 and/or the fourth side S4 to the first area DA1. The first area DA1 may be positioned between the second area DA2 and the first side S1 and/or the fourth side S4.

The third area DA3 may be elongated along the first side S1 and/or the fourth side S4. A third plurality of holes h may be sequentially formed in the third area DA3 at regular intervals. The third area DA3 may be in contact with or next to the second area DA2. A distance from the first side S1 and/or the fourth side S4 to the third area DA3 may be greater than a distance from the first side S1 and/or the fourth side S4 to the second area DA2. The second area DA2 may be positioned between the third area DA3 and the first area DA1.

The fourth area DA4 may be elongated along the fourth side S4. A fourth plurality of holes h may be sequentially formed in the fourth area DA4 at regular intervals. The fourth area DA4 may be in contact with or next to the third area DA3. A distance from the first side S1 and/or the fourth side S4 to the fourth area DA4 may be greater than a distance from the first side S1 and/or the fourth side S4 to the third area DA3. The third area DA3 may be positioned between the fourth area DA4 and the second area DA2.

The central area CDA may be an area of the reflective sheet 226 excluding the first area DA1, the second area DA2, the third area DA3, and the fourth area DA4.

The light pattern DLP may include a phosphor. The light pattern DLP may include a red-based phosphor and a green-based phosphor. The light pattern DLP may include a yellow-based phosphor.

For example, the light pattern DLP may have a yellow-based color, when viewed with the naked eye. The light pattern DLP may convert blue-based light, provided by the light source 224 (see FIG. 5) or the optical assembly 224, into white light.

In another example, the light pattern DLP may have black or gray-based color, when viewed with the naked eye. The light pattern DLP may absorb light provided by the light source 224 (see FIG. 5) or the optical assembly 224.

The light pattern DLP may include dots DLP. The dots DLP may be disposed around the hole h. The dots DLP may be disposed to surround the hole h.

First dots DLP1 may be disposed around at least one hole h among the first plurality of holes h. For example, the first dots DLP1 may be eight in number, and the eight first dots DLP1 may be sequentially arranged around the hole h at regular intervals.

Second dots DLP2 may be disposed around at least one hole h among the second plurality of holes h. For example, the second dots DLP2 may be eight in number, and the eight second dots DLP2 may be sequentially arranged around the hole h at regular intervals.

Third dots DLP3 may be disposed around at least one hole h among the third plurality of holes h. For example, the third dots DLP3 may be eight in number, and the eight third dots DLP3 may be sequentially arranged around the hole h at regular intervals.

Fourth dots DLP4 may be disposed around at least one hole h among the fourth plurality of holes h. For example, the fourth dots DLP4 may be three or four in number, and the four fourth dots DLP4 may be sequentially arranged around the hole h at regular intervals. The dots DLP4 around the hole h that is adjacent to the cut-line CL1 may be three in number. The dots DLP4 may be excluded from an area adjacent to the cut-line CL1 around the hole h.

For example, the size of the first dot DLP1 may be greater than the size of the second dot DLP2. The size of the second dot DLP2 may be greater than the size of the third dot DLP3. The size of the third dot DLP3 may be greater than the size of the fourth dot DLP4.

In another example, the first dot DLP1, the second dot DLP2, the third dot DLP3, and the fourth dot DLP4 may have the same size. In the case where the dots DLP have the same size, the number of the dots DLP may increase.

The intermediate area MDA1 may be positioned between the first plurality of holes h. The intermediate area MDA1 may be formed between the first plurality of holes h adjacent to the first side S1. The intermediate area MDA1 may be elongated in a direction intersecting or perpendicular to a longitudinal direction of the first side S1. The dots DLP1 may be disposed in the intermediate area MDA1. For example, a plurality of dots DLP1 may be disposed in a longitudinal direction of the intermediate area MDA1. For example, the dots DLP1 may be two in number.

The intermediate area MDA2 may be positioned between the first plurality of holes h. The intermediate area MDA2 may be formed between the first plurality of holes h adjacent to the fourth side S4. A plurality of intermediate areas MDA2 may be formed between the first plurality of holes h adjacent to the fourth side S4. The intermediate area MDA2 may form a triangular area. The dots DLP1 may be disposed in the intermediate area MDA2. For example, a plurality of dots DLP1 may be disposed in the intermediate area MDA2. For example, the dots DLP1 may be three in number.

The intermediate area MDA2 may be positioned between the second plurality of holes h. The intermediate area MDA2 may be formed between the second plurality of holes h adjacent to the fourth side S4. A plurality of intermediate areas MDA2 may be formed between the second plurality of holes h adjacent to the fourth side S4. The intermediate area MDA2 may form a triangular area. The dots DLP2 may be disposed in the intermediate area MDA2. For example, a plurality of dots DLP2 may be disposed in the intermediate area MDA2. For example, the dots DLP2 may be three in number.

The intermediate area MDA2 may be formed between the first area DA1 and the second area DA2. The intermediate area MDA2 may be formed between the second area DA2 and the third area DA3. The intermediate area MDA2 may form a generally triangular area TDA extending over the second area DA2 and the third area DA3.

The description of the second corner C2 may be applied to other corners C1, C3, and C4.

Figure 16:
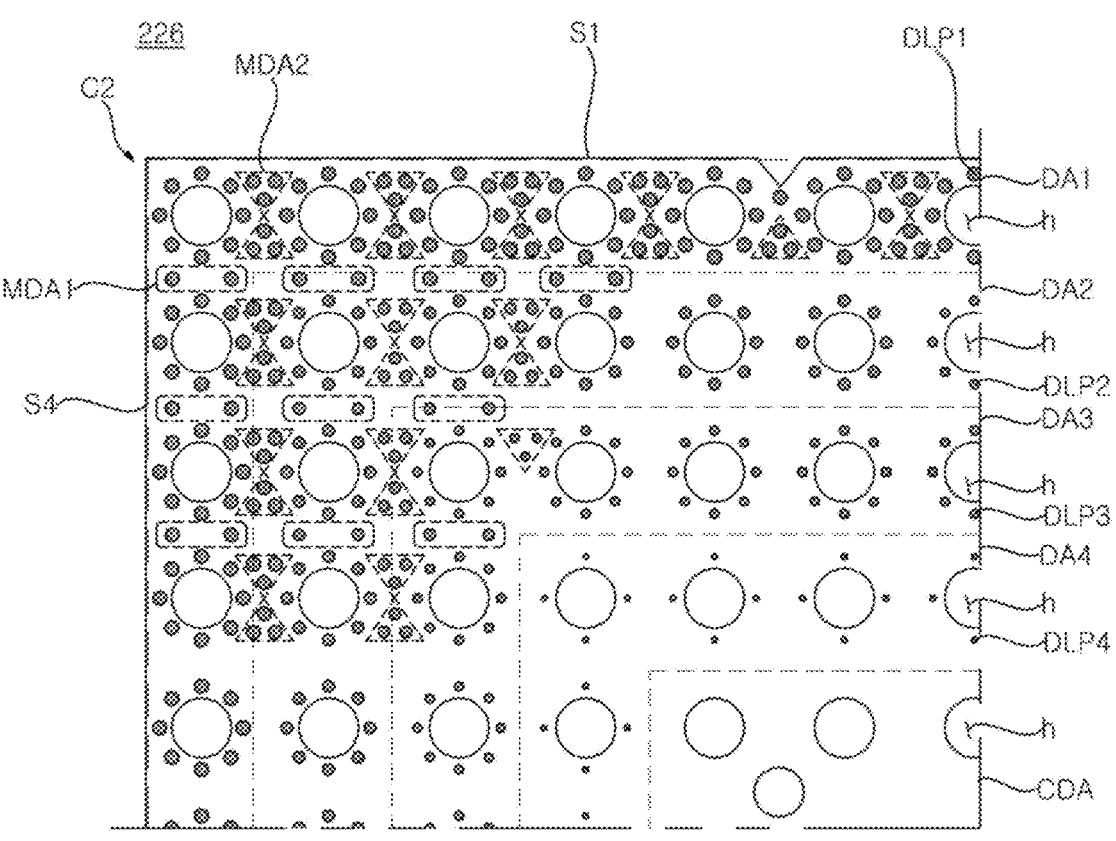

Referring to FIG. 16, the reflective sheet 226 may include a first area DA1, a second area DA2, a third area DA3, a fourth area DA4, a central area CDA, and an intermediate area MDA1, MDA2. The area DA may be referred to as a dot area DA or a pattern area DA.

The first area DA1 may be elongated along the first side S1 and/or the fourth side S4. A first plurality of holes h may be sequentially formed in the first area DA1 at regular intervals. The first area DA1 may be in contact with the first side S1 and/or the fourth side S4. The description of the first side S1 and/or the fourth side S4 may be applied to other sides S2 and S3 (see FIG. 7).

The second area DA2 may be elongated along the first side S1 and/or the fourth side S4. A second plurality of holes h may be sequentially formed in the second area DA2 at regular intervals. The second area DA2 may be in contact with or next to the first area DA1. A distance from the first side S1 and/or the fourth side S4 to the second area DA2 may be greater than a distance from the first side S1 and/or the fourth side S4 to the first area DA1. The first area DA1 may be disposed between the second area DA2 and the first side S1 and/or the fourth side S4.

The third area DA3 may be elongated along the first side S1 and/or the fourth side S4. A third plurality of holes h may be sequentially formed in the third area DA3 at regular intervals. The third area DA3 may be in contact with or next to the second area DA2. A distance from the first side S1 and/or the fourth side S4 to the third area DA3 may be greater than a distance from the first side S1 and/or the fourth side S4 to the second area DA2. The second area DA2 may be disposed between the third area DA3 and the first area DA1.

The fourth area DA4 may be elongated along the first side S1 and/or the fourth side S4. A fourth plurality of holes h may be sequentially formed in the fourth area DA4 at regular intervals. The fourth area DA4 may be in contact with or next to the third area DA3. A distance from the first side S1 and/or the fourth side S4 to the fourth area DA4 may be greater than a distance from the first side S1 and/or the fourth side S4 to the third area DA3. The third area DA3 may be disposed between the fourth area DA4 and the second area DA2.

The central area CDA may be an area of the reflective sheet 226 excluding the first area DA1, the second area DA2, the third area DA3, and the fourth area DA4.

The light pattern DLP may include a phosphor. The light pattern DLP may include a red-based phosphor and a green-based phosphor. The light pattern DLP may include a yellow-based phosphor.

For example, the light pattern DLP may have a yellow-based color, when viewed with the naked eye. The light pattern DLP may convert blue-based light, provided by the light source 224 (see FIG. 5) or the optical assembly 224, into white light.

In another example, the light pattern DLP may have black or gray-based color, when viewed with the naked eye. The light pattern DLP may absorb light provided by the light source 224 (see FIG. 5) or the optical assembly 224.

The light pattern DLP may include dots DLP. The dots DLP may be disposed around the hole h. The dots DLP may be disposed to surround the hole h.

First dots DLP1 may be disposed around at least one hole h among the first plurality of holes h. For example, the first dots DLP1 may be eight in number, and the eight first dots DLP1 may be sequentially arranged around the hole h at regular intervals.

Second dots DLP2 may be disposed around at least one hole h among the second plurality of holes h. For example, the second dots DLP2 may be eight in number, and the eight second dots DLP2 may be sequentially arranged around the hole h at regular intervals.

Third dots DLP3 may be disposed around at least one hole h among the third plurality of holes h. For example, the third dots DLP3 may be eight in number, and the eight third dots DLP3 may be sequentially arranged around the hole h at regular intervals.

Fourth dots DLP4 may be disposed around at least one hole h among the fourth plurality of holes h. For example, the fourth dots DLP4 may be four in number, and the four fourth dots DLP4 may be sequentially arranged around the hole h at regular intervals.

For example, the size of the first dot DLP1 may be greater than the size of the second dot DLP2. The size of the second dot DLP2 may be greater than the size of the third dot DLP3. The size of the third dot DLP3 may be greater than the size of the fourth dot DLP4.

In another example, the first dot DLP1, the second dot DLP2, the third dot DLP3, and the fourth dot DLP4 may have the same size. In the case where the dots DLP have the same size, the number of the dots DLP may increase.

The intermediate area MDA1 may be located between the first plurality of holes h. The intermediate area MDA1 may be formed between the first plurality of holes h adjacent to the fourth side S4. The intermediate area MDA1 may be elongated in a direction intersecting or perpendicular to a longitudinal direction of the fourth side S4. The dots DLP1 may be disposed in the intermediate area MDA1. For example, a plurality of dots DLP1 may be disposed in a longitudinal direction of the intermediate area MDA1. For example, the dots DLP1 may be two in number.

The intermediate area MDA2 may be located between the first plurality of holes h. The intermediate area MDA2 may be formed between the first plurality of holes h adjacent to the first side S1. A plurality of intermediate areas MDA2 may be formed between the first plurality of holes h adjacent to the first side S1. The intermediate area MDA2 may form a triangular area. The dots DLP1 may be disposed in the intermediate area MDA2. For example, a plurality of dots DLP1 may be disposed in the intermediate area MDA2. For example, the dots DLP1 may be three in number.

The intermediate area MDA1 may be located between the second plurality of holes h. The intermediate area MDA1 may be formed between the second plurality of holes h adjacent to the fourth side S4. The intermediate area MDA1 may be elongated in a direction intersecting or perpendicular to a longitudinal direction of the fourth side S4. The dots DLP2 may be disposed in the intermediate area MDA1. For example, a plurality of dots DLP2 may be disposed in a longitudinal direction of the intermediate area MDA1. For example, the dots DLP2 may be two in number.

The intermediate area MDA2 may be located between the second plurality of holes h. The intermediate area MDA2 may be formed between the second plurality of holes h adjacent to the first side S1. A plurality of intermediate areas MDA2 may be formed between the second plurality of holes h adjacent to the first side S1. The intermediate area MDA2 may form a triangular area. The dots DLP2 may be disposed in the intermediate area MDA2. For example, a plurality of dots DLP2 may be disposed in the intermediate area MDA2. For example, the dots DLP2 may be three in number.

The intermediate area MDA1 may be located between the third plurality of holes h. The intermediate area MDA1 may be formed between the third plurality of holes h adjacent to the fourth side S4. The intermediate area MDA1 may be elongated in a direction intersecting or perpendicular to a longitudinal direction of the fourth side S4. The dots DLP3 may be disposed in the intermediate area MDA1. For example, a plurality of dots DLP3 may be disposed in a longitudinal direction of the intermediate area MDA1. For example, the dots DLP3 may be two in number.

The intermediate area MDA2 may be located between the third plurality of holes h. The intermediate area MDA2 may be formed between the third plurality of holes h adjacent to the first side S1. A plurality of intermediate areas MDA2 may be formed between the third plurality of holes h adjacent to the first side S1. The intermediate area MDA2 may form a triangular area. The dots DLP3 may be disposed in the intermediate area MDA2. For example, a plurality of dots DLP3 may be disposed in the intermediate area MDA2. For example, the dots DLP3 may be three in number.

The intermediate area MDA2 may be formed between the first area DA1 and the second area DA2. The intermediate area MDA2 may be formed between the second area DA2 and the third area DA3.

The description of the second corner C2 may be applied to other corners C1, C3, and C4.

Figure 17:
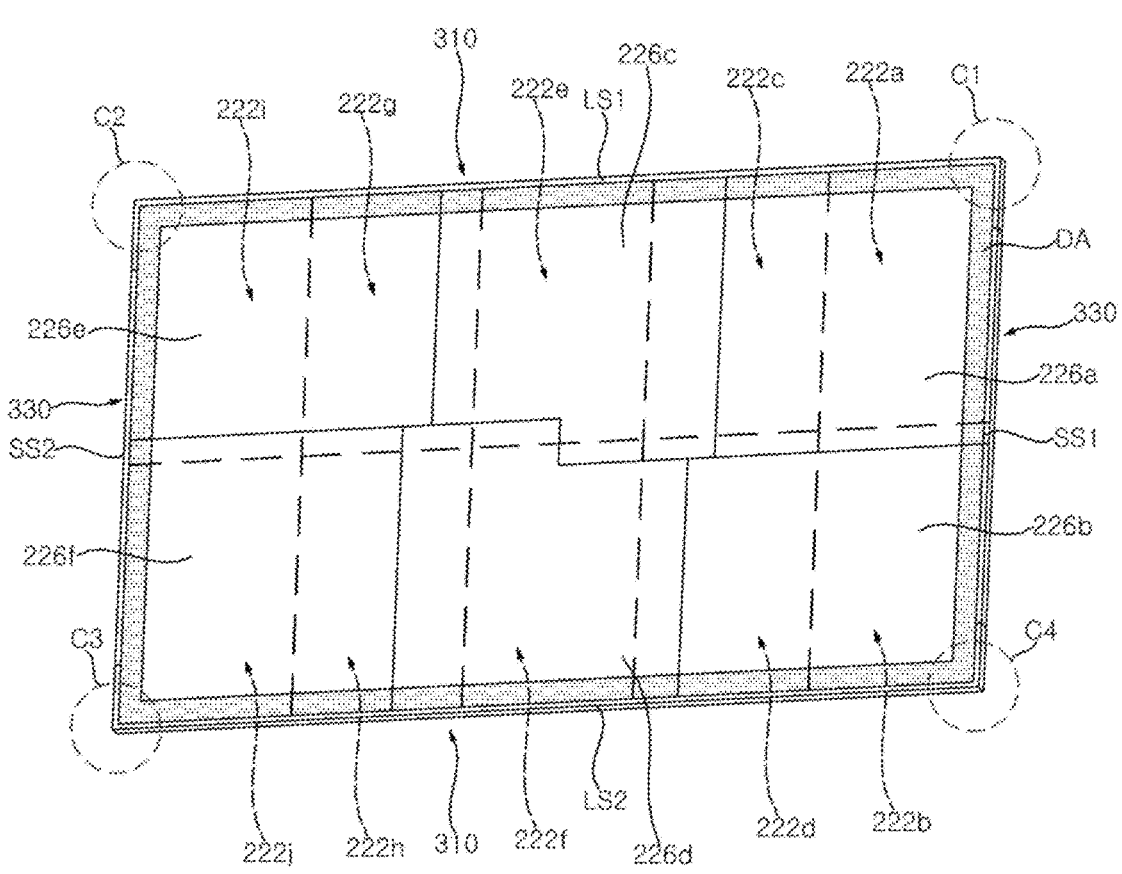

Referring to FIG. 17, an inner frame 310, 330 may be coupled to sides LS1, LS2, SS1, and SS2 or edges LS1, LS2, SS1, and SS2 of the rear frame 130. The inner frame 310, 330 may include a plurality of parts 310 and 330. A first part 310 may be coupled to the first long side LS1 of the rear frame 130. A second part 310 may be coupled to the second long side LS2 of the rear frame 130. A third part 330 may be coupled to the first short side SS1 of the rear frame 130. A fourth part 330 may be coupled to the second short side SS2 of the rear frame 130. The first part 310 may be coupled to the third part 330 and the fourth part 330, and the second part 310 may be coupled to the third part 330 and the fourth part 330. The first part 310, the second part 310, the third part 330, or the fourth part 330 may be referred to as the inner frame 310, 330.

Figure 18:
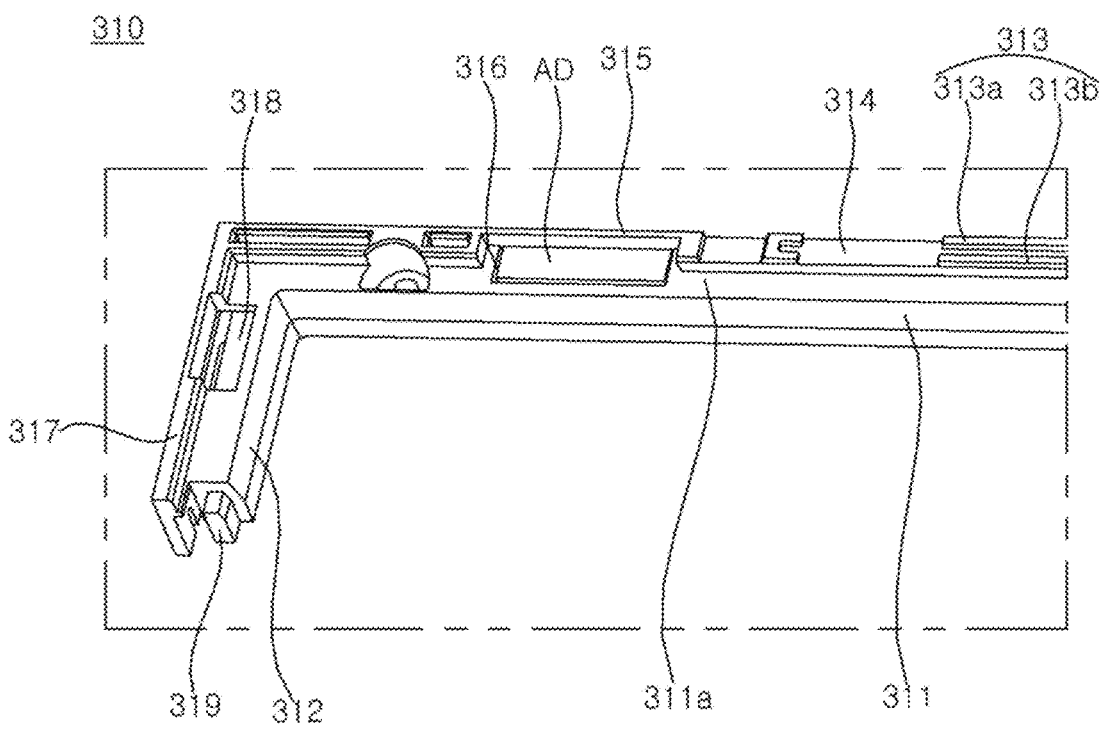
Figure 19:
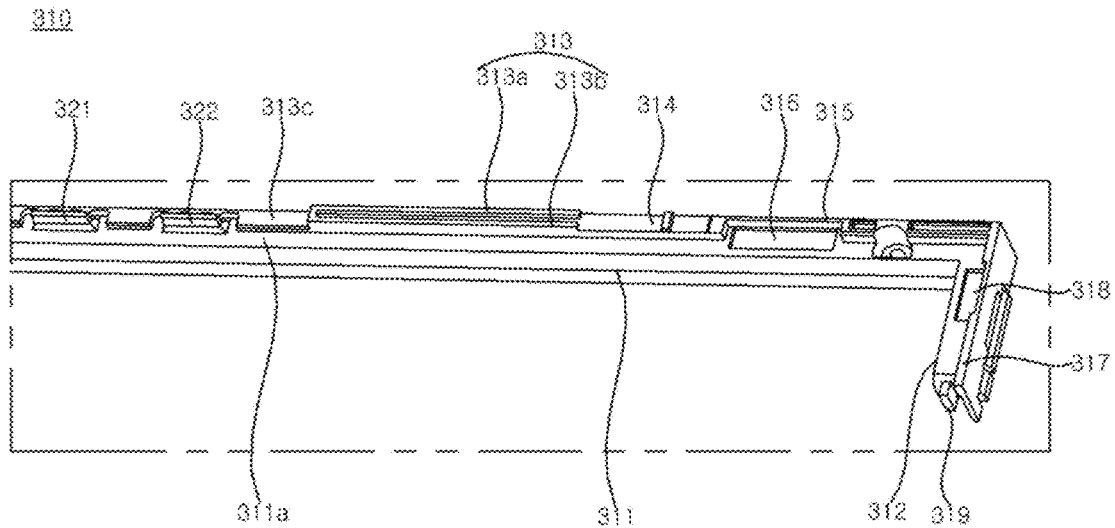

Referring to FIGS. 18 and 19, the inner frame 310 may be elongated and may have a bar shape that is curved at both ends. A center part 311 may be elongated and may have a rectangular cross-section. A support surface 311*a* may form one surface of the center part 311. A frame wall 313 may protrude from the support surface 311*a* and may be elongated in a longitudinal direction of the center part 311. A plurality of frame walls 313 may be formed side by side. A first frame wall 313*a* may be spaced apart from a second frame wall 313*b*.

An accommodation portion 314 may be formed on the frame wall 313. The accommodation portion 314 may be formed as a flat surface at an upper end of the frame wall 313. A length of the accommodation portion 314 may be smaller than a length of the frame wall 313. A recessed portion 316 may be formed in the support surface 311*a*. The recessed portion 316 may be stepped downward from the support surface 311*a*. A cover wall 315 may be formed on one side of the recessed portion 316. The cover wall 315 may be disposed in alignment with an extension line of the first frame wall 313*a*. A pad AD or an adhesive pad AD may be fixed to the recessed portion 316, and the pad AD or the adhesive pad AD may support the optical layer 129 (see FIG. 3).

A side part 312 may extend while being bent from one or both ends of the center part 311. The support surface 311*a* may form one surface of the side part 312. A coupling rib 319 may protrude from one end of the side part 312. The recessed portion 318 may be stepped downward from the support surface 311*a* of the side part 312. The cover wall 317 may be disposed on one side of the recessed portion 318 of the side part 312, and may be connected to the cover wall 315 of the center part 311.

Figure 20:
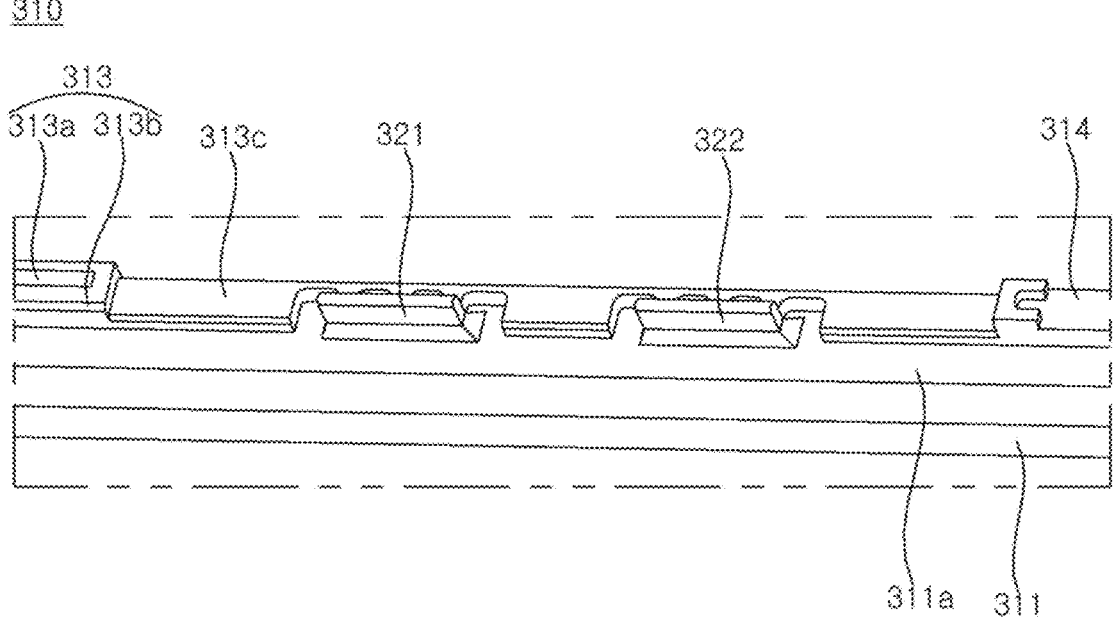

Referring to FIGS. 19 and 20, a coupling rib 321, 322 may protrude from the support surface 311*a* of the center part 311 and may be provided in plurality. A first coupling rib 321 may protrude from the support surface 311*a* of the center part 311 and may be elongated in a longitudinal direction of the center part 311. A second coupling rib 322 may be disposed next to the first coupling rib 321, and may be disposed in alignment with an extension line of the first coupling rib 321.

A third frame wall 313*c* may extend from the first frame wall 313*a* and/or the second frame wall 313*b*. The third frame wall 313*c* may be disposed adjacent to the first coupling rib 321 and the second coupling rib 322, and may be in contact with one edge of the center part 311. The height of the third frame wall 313*c* may be smaller than the height of the first frame wall 313*a* and/or the second frame wall 313*b*.

Figure 21:
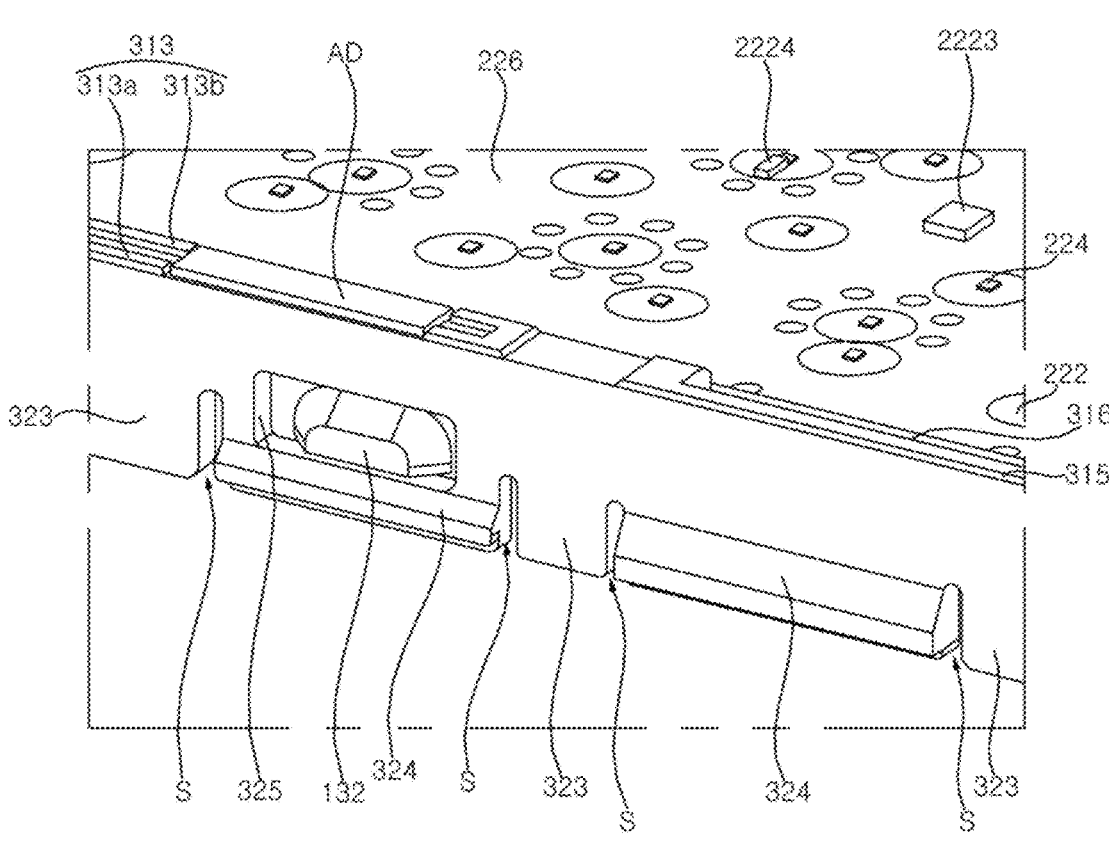

Referring to FIG. 21 together with FIG. 19, the inner frame 310 may include a middle coupler 324, 325. The middle coupler 324, 325 may be disposed on an outer surface of the center part 311. The middle coupler 324, 325 may be provided in plurality. A first middle coupler 324 may be defined by slots S or slits S formed by cutting out an outer surface 323 of the center part 311.

A first middle coupler 324, 325 may include a locking protrusion 324 protruding from the outer surface 323 of the center part 311. The locking protrusion 324 may be formed adjacent to a distal end of the first middle coupler 324, 325 in a longitudinal direction of the center part 311. A coupling hole 325 may pass through the first middle coupler 324, 325 to be formed between the support surface 311*a* and the locking protrusion 324. A protrusion 132 of the frame 130 may be inserted into the coupling hole 325 of the first middle coupler 324, 325.

A second middle coupler 324 may be positioned next to the first middle coupler 324, 325 in the longitudinal direction of the center part 311. The second middle coupler 324 may include a locking protrusion 324 protruding from the outer surface of the center part 311. The locking protrusion 324 may be formed adjacent to a distal end of the second middle coupler 324 in the longitudinal direction of the center part 311.

The pad AD or the adhesive pad AD may be positioned in or fixed to the accommodation portion 314.

Figure 22:
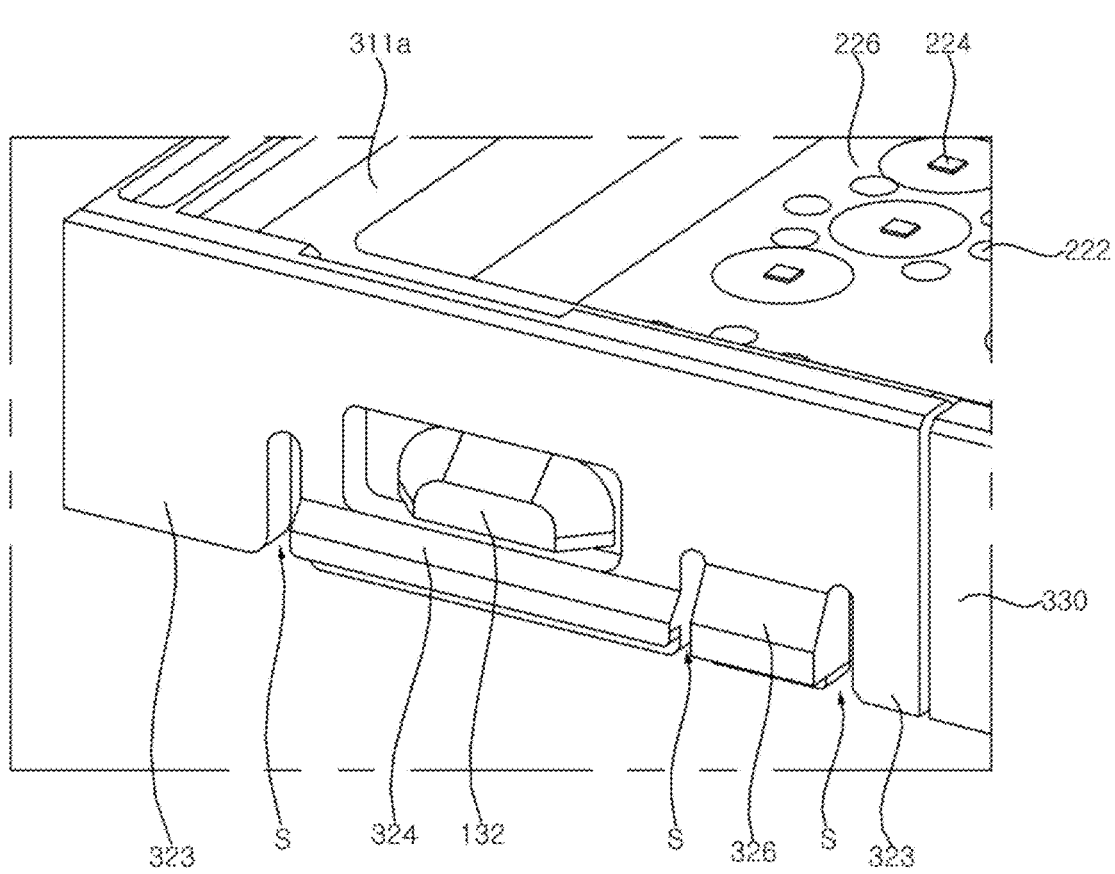

Referring to FIG. 22 together with FIG. 19, the inner frame 310 may include a side middle coupler 324, 325, 326. The side middle coupler 324, 325, 326 may be disposed on an outer surface of the side part 312. The side middle coupler 324, 325, 326 may be provided in plurality. The side middle coupler 324, 325 may be defined by slots S formed by cutting out the outer surface 323 of the side part 312.

A third middle coupler 324, 325 may include a locking protrusion 324 protruding from the outer surface 323 of the side part 312. The locking protrusion 324 may be formed adjacent to a distal end of the third middle coupler 324, 325. The coupling hole 325 may pass through the third middle coupler 324, 325 to be formed between the support surface 311*a* and the locking protrusion 324. The protrusion 132 of the frame 130 may be inserted into the coupling hole 325 of the third middle coupler 324, 325.

A fourth middle coupler 326 may be disposed next to the third middle coupler 324, 325 in a longitudinal direction of the side part 312. The fourth middle coupler 326 may include a locking protrusion 326 protruding from the outer surface 323 of the side part 312. The locking protrusion 326 may be formed adjacent to a distal end of the fourth middle coupler 326 in the longitudinal direction of the side part 312. A slot S may be formed between the third middle coupler 324, 325 and the fourth middle coupler 326.

Figure 23:
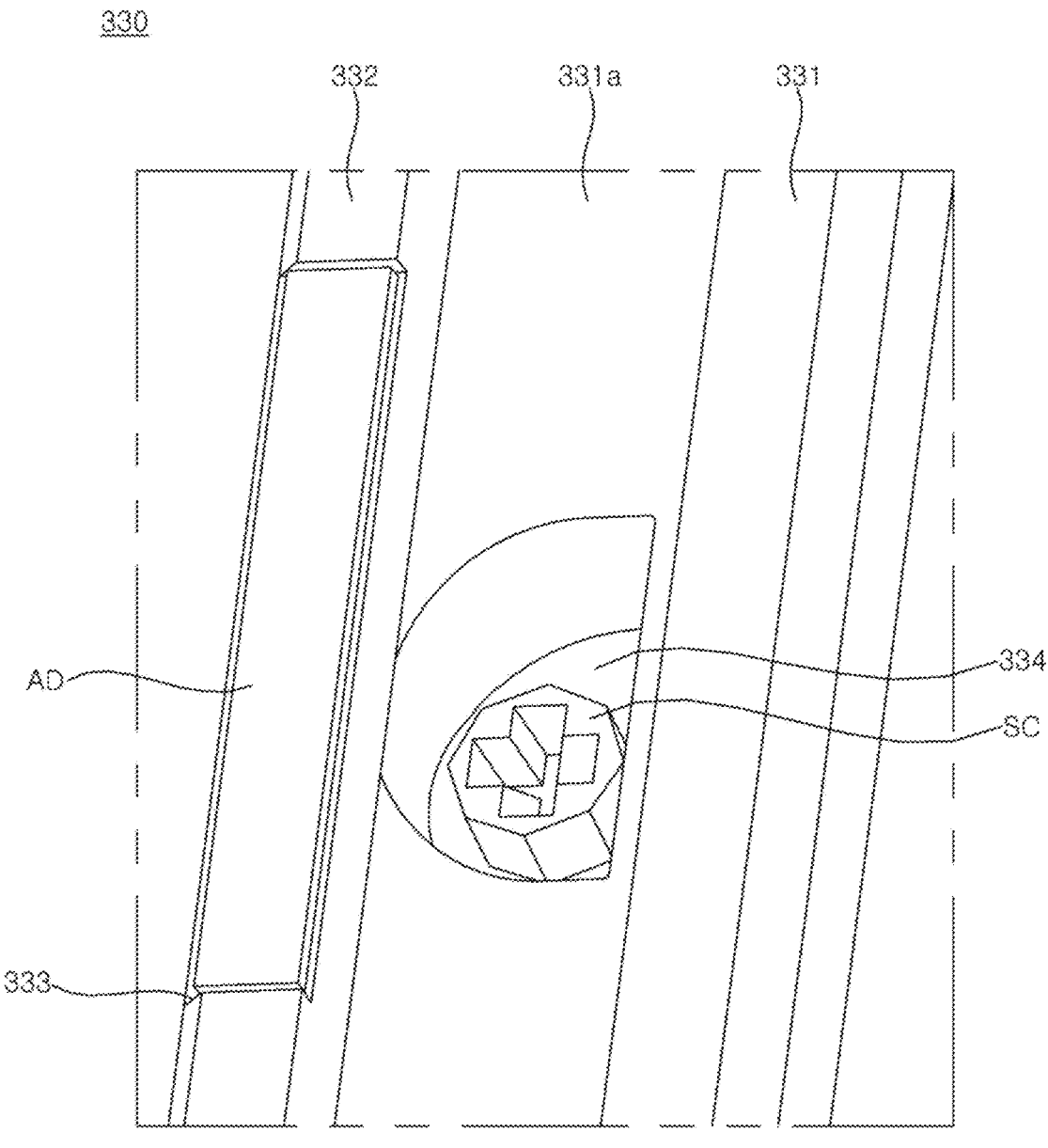

Referring to FIG. 23, the inner frame 330, 331 may include a support surface 331*a* and a side wall 332. The support surface 331*a* may form one surface of a third part 331 and/or a fourth part 331. A coupling recess 334 may be formed in the support surface 331*a* of the inner frame 330, 331. The rear frame 130 and the inner frame 330 may be coupled by a screw SC inserted into the coupling recess 334. An accommodation portion 333 may be formed by recessing or cutting out the upper surface of the sidewall 332. The pad AD or the adhesive pad AD may be disposed on or fixed to the accommodation portion 333.

Figure 24:
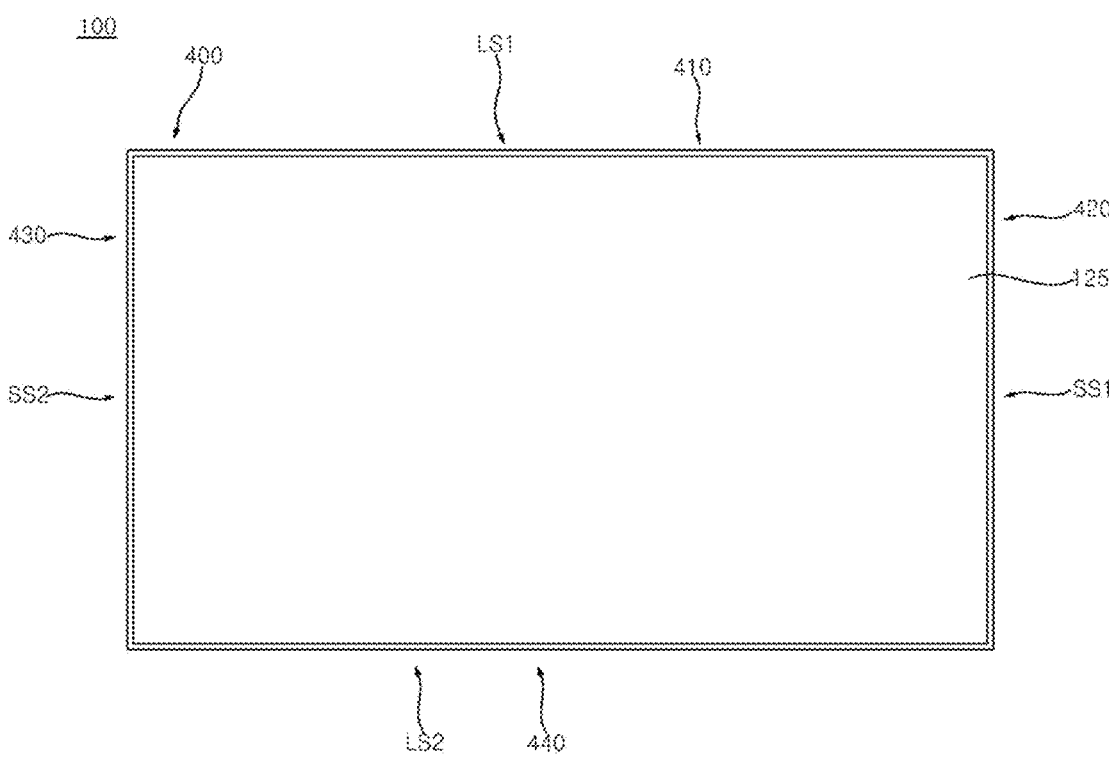
Figure 25:
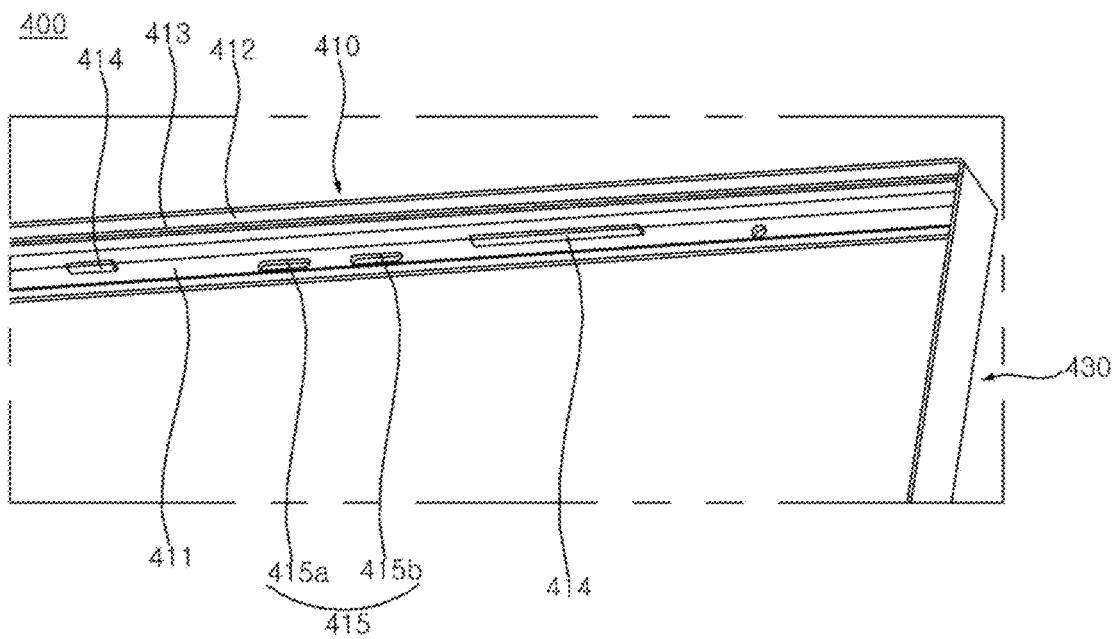
Figure 26:
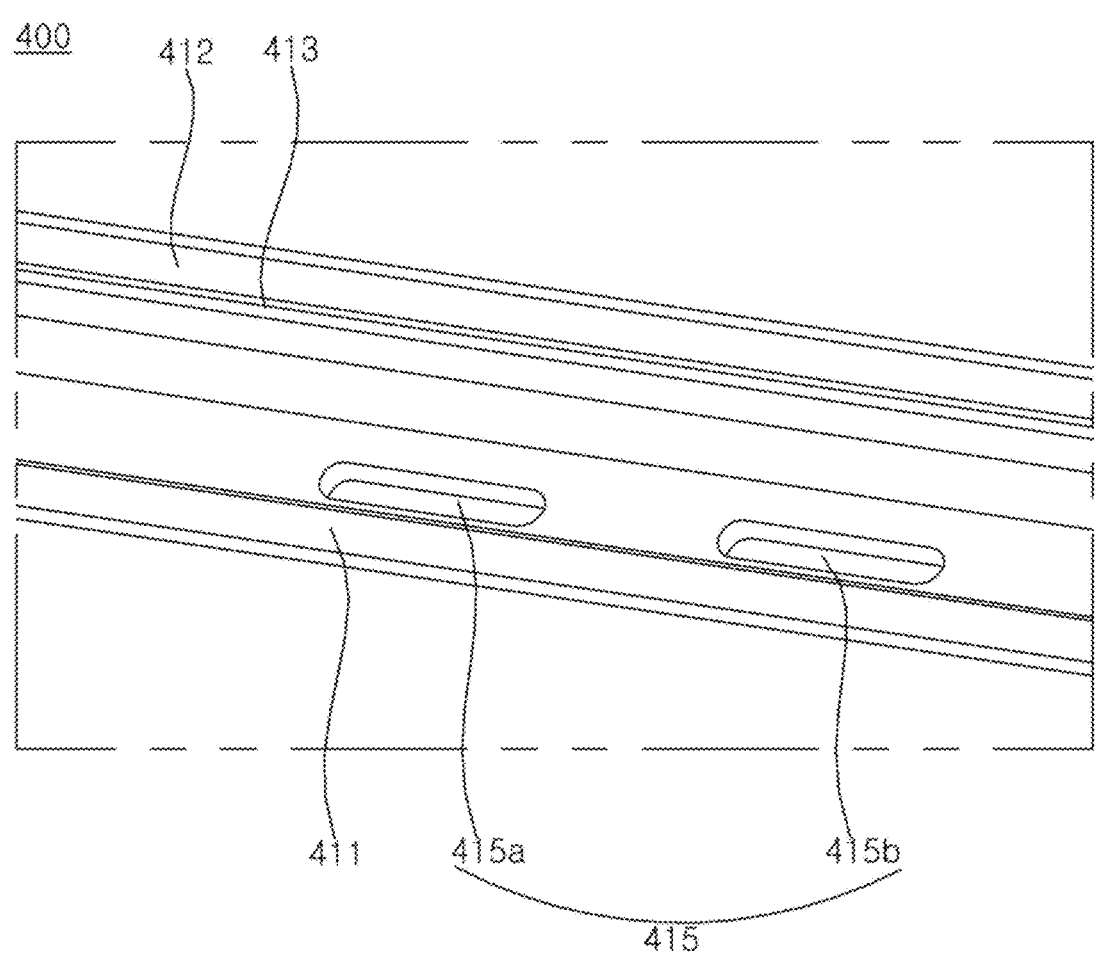

Referring to FIGS. 24 to 26, the optical layer 123 may be placed on the inner frame 310, 330. An outer frame 400 may be coupled to the inner frame 310, 330 while covering the periphery of the optical layer 123. The outer frame 400 may be referred to as a guide panel 400. An outer frame 410, 420, 430 may be coupled to the first short side SS1, the first long side LS1, and/or the second short side SS2 as the elongated frame 400 is bent. A separate outer frame 440 may be coupled to the second long side LS2.

A first part 410 of the outer frame 400 may include a horizontal portion 411 and a vertical portion 412. The description of the first part 410 may be applied to the second part 420 and/or the third part 430. The horizontal portion 411 may have an elongated plate shape. The vertical portion 412 may have a plate shape that is bent and elongated from the horizontal portion 411. A rib hole 415 may be formed in the horizontal portion 411. There may be a plurality of rib holes 415. A first rib hole 415*a* may be an elongated long hole. A second rib hole 415*b* may be a long hole and may be disposed in a longitudinal direction of the first rib hole 415*a*. The rib holes 415 may be formed through the horizontal portion 411.

A guide rib 414 may protrude from the horizontal portion 411 to be elongated. The guide rib 414 may be parallel to the vertical portion 412. The rib holes 415 may be positioned between the guide ribs 414. A hook line 413 may be formed at the vertical portion 412. The hook line 413 may be adjacent to the guide rib 414 or may face the guide rib 414.

Figure 27:
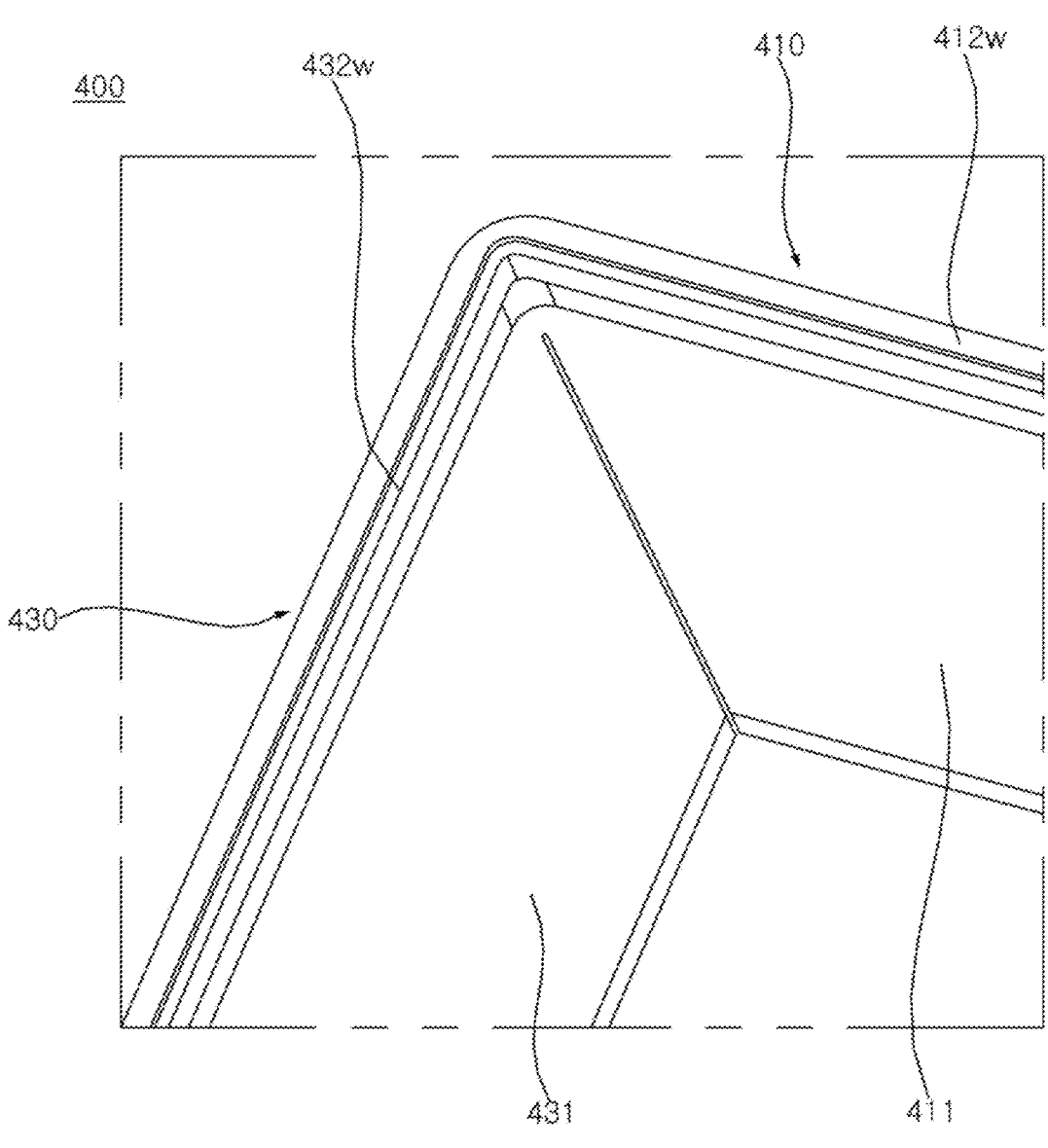

Referring to FIG. 27, the first part 410 may include a horizontal portion 411 and a vertical wall 412W. The vertical wall 412W may have a constant height from the horizontal portion 411. The third part 430 may include a horizontal portion 431 and a vertical wall 432W. The vertical wall 432W may have a constant height from the horizontal portion 431.

The vertical wall 412W of the first part 411 may be connected to the vertical wall 432W of the third part 430. A corner formed by the vertical wall 412W of the first part 411 and the vertical wall 432W of the third part 430 may be rounded. The vertical wall 412W of the first part 410 may form a gap with the vertical wall 432W of the third part 430.

Figure 28:
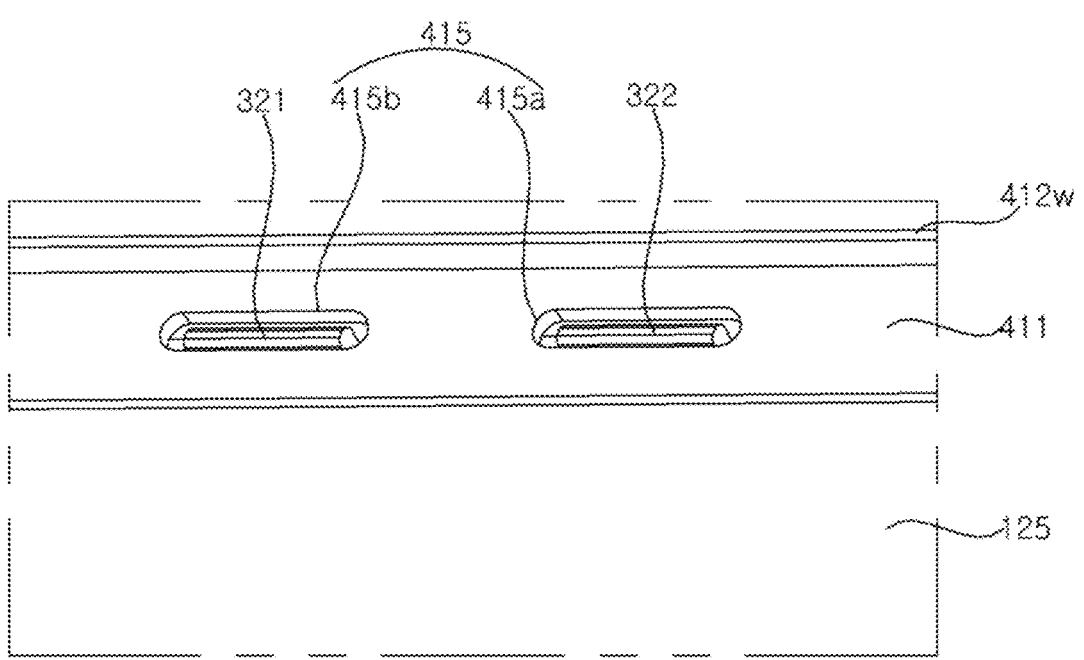
Figure 29:
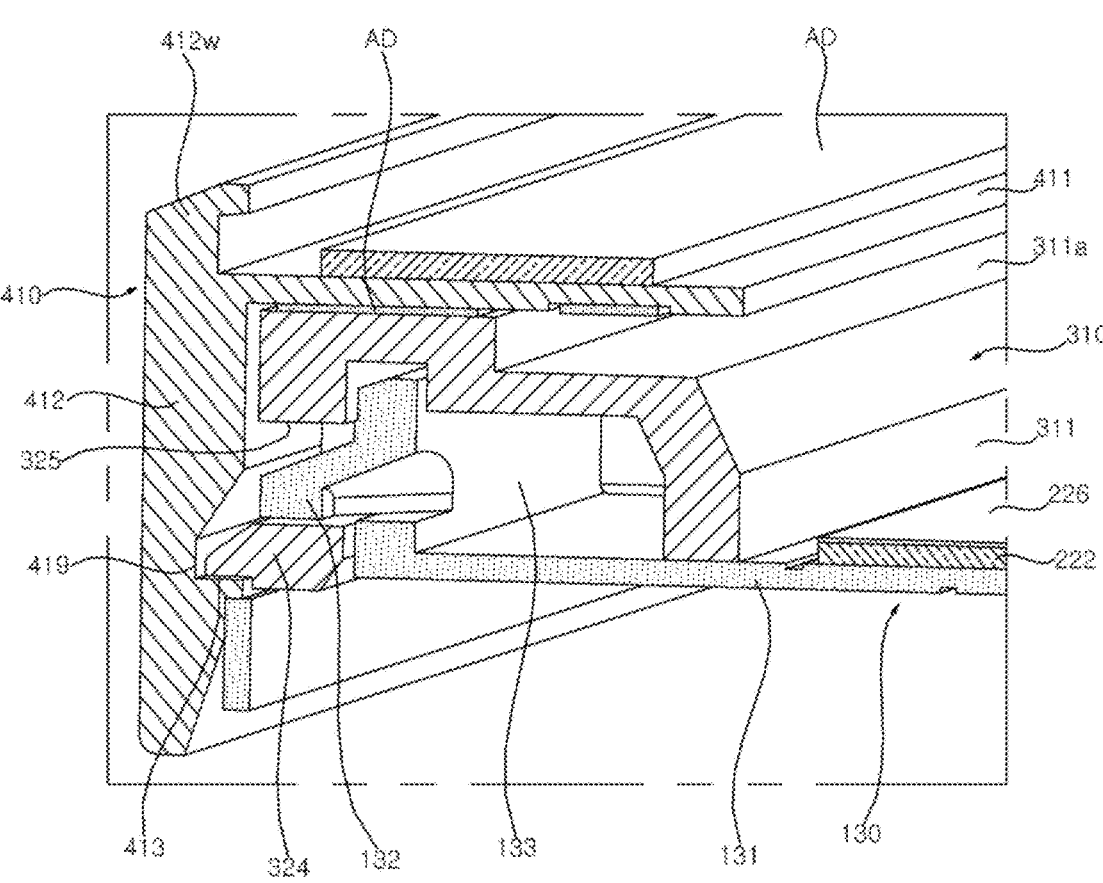

Referring to FIGS. 28 and 29, the outer frame 400 may be coupled to the rear frame 130 and/or the inner frame 310, 330 (see FIG. 17) while covering the optical sheet 125. The horizontal portion 411 of the outer frame 400 may be placed on the optical sheet 125, and the coupling ribs 321 and 322 to which the optical sheet 125 is coupled may be inserted into the rib hole 415.

The pad AD or the adhesive member AD may be positioned on or fixed to the horizontal portion 411 of the outer frame 400. For example, the pad AD may be a double-sided tape having a constant thickness. The display panel 110 (see FIG. 30) may be placed on the outer frame 400 and may be fixed to the horizontal portion 411 by the pad AD.

Figure 30:
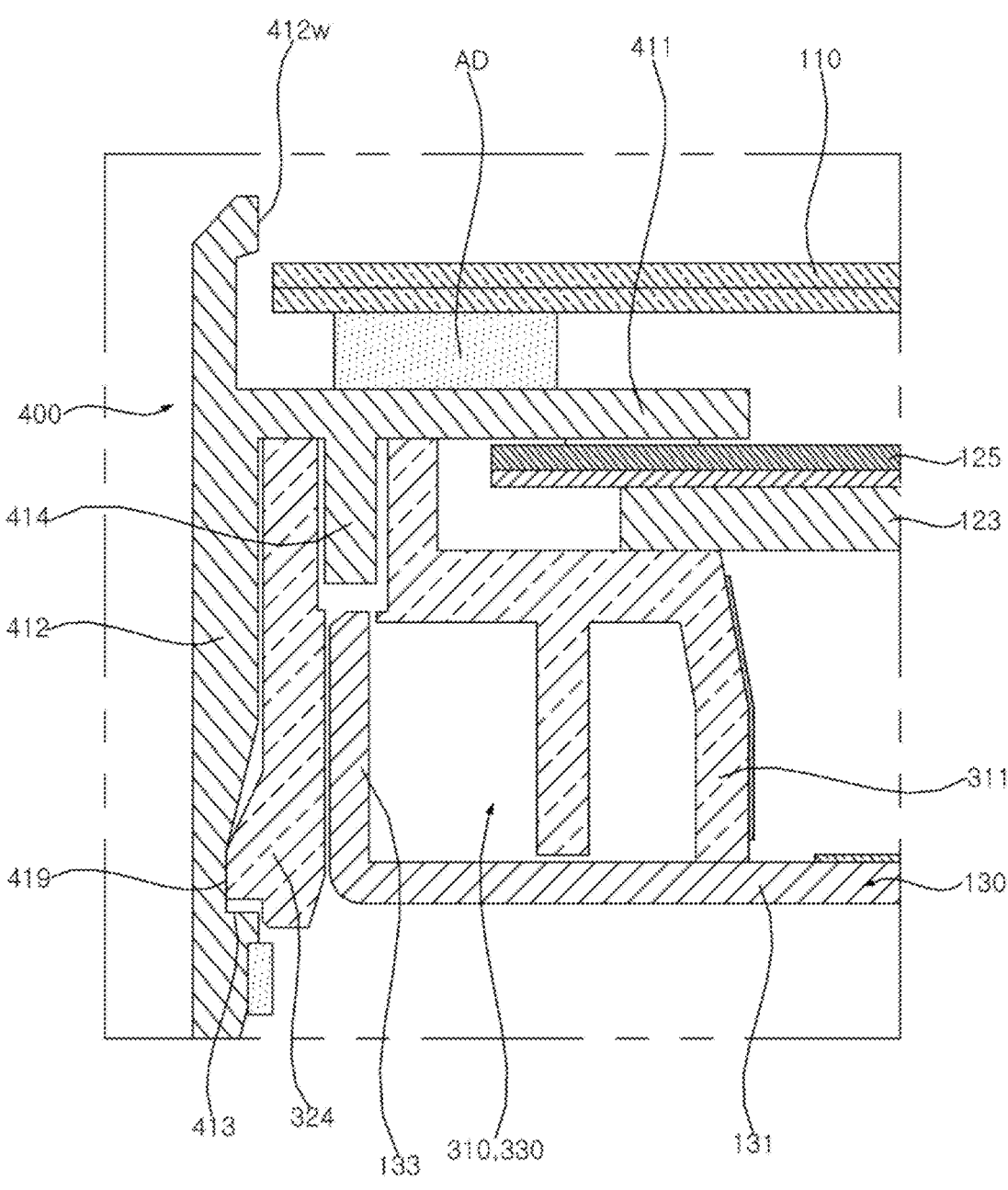

Referring to FIGS. 29 and 30, the center frame 311 of the inner frame 310 may be coupled to one side of the rear frame 130. A distal end of the bent rear frame 130 may be inserted into the center frame 311 of the inner frame 310. The protrusion 132 protruding to the outside of the rear frame 130 may be inserted into he coupling hole 325 of the inner frame 310.

The outer frame 410 may include a line groove 419. The line groove 419 may be formed in the vertical portion 412 of the outer frame 410. The locking protrusion 324 of the inner frame 310 may be inserted into the line groove 419 of the outer frame 410. The locking protrusion 324 of the inner frame 310 may be engaged with the hook line 413 of the outer frame 410.

The guide rib 414 of the outer frame 410 may be inserted into the inner frame 310. The guide rib 414 may be inserted and fixed into the inner frame 310 as the outer frame 410 is placed on the inner frame 310.

The optical layer 123 and the optical sheet 125 may be placed on the support surface 311a of the inner frame 310 and may be positioned between the support surface 311a of the inner frame 310 and the horizontal portion 411 of the outer frame 410. The display panel 110 may be placed on the horizontal portion 411 of the outer frame 410, and the vertical wall 412W may cover the side surface of the display panel 110.

Figure 31:
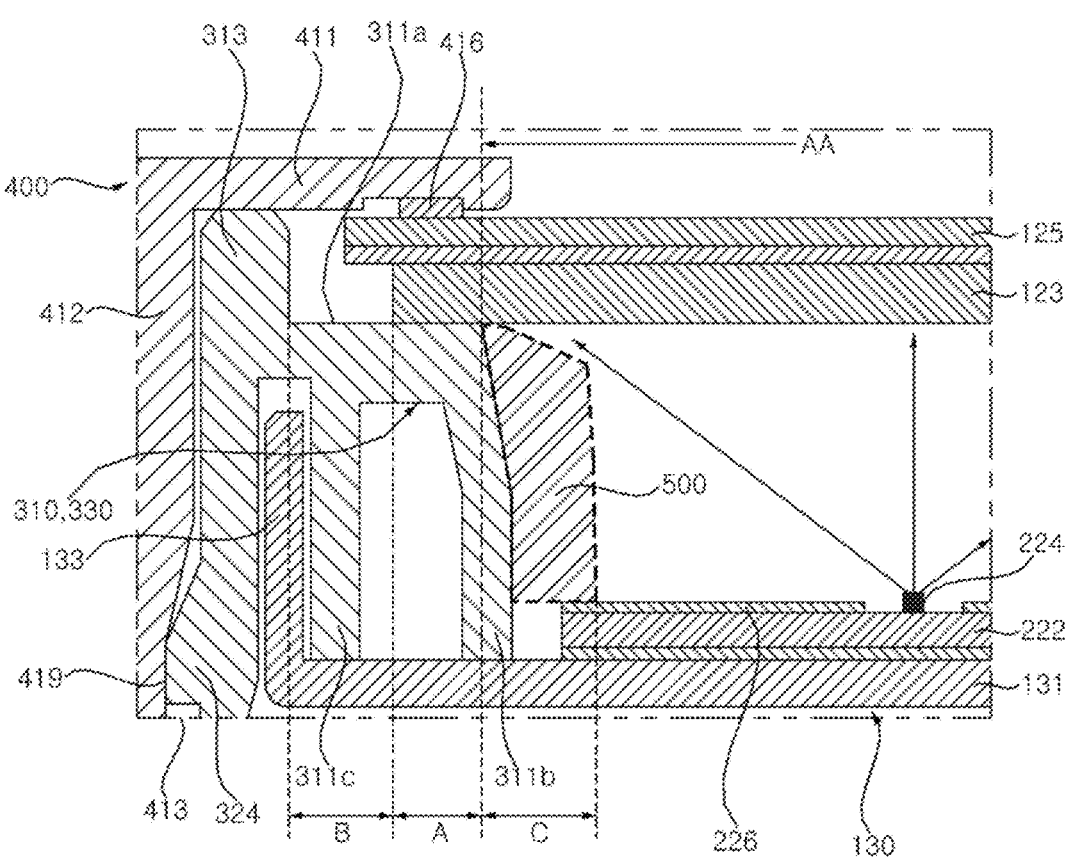

Referring to FIGS. 30 and 31, the frame 130 may include a rear plate 131 and a bending part 133. The rear plate 131 may be disposed at the rear of the display panel 110 and may face the display panel 110. The bending part 133 may be bent and extend from the rear plate 131. The inner frame 310, 330 may be coupled to the frame 130. The bending part 133 may be inserted into the inner frame 310, 330.

The inner frame 310, 330 may include the support surface 311a, the frame wall 331, a front leg 311b, and a middle leg

311c. The support surface 311a may be elongated and may be parallel to or face the rear plate 131 of the frame 130. The optical layer 123 may be placed on the support surface 311a of the inner frame 310, 330. The optical sheet 125 may be stacked on the optical layer 123. The frame wall 313 may protrude above the support surface 311a and may be elongated in a direction of extension of the support surface 311a. The frame wall 313 may cover the side surface of the optical sheet 125 and the optical layer 123 and may face the side surface. The optical sheet 125 may be spaced apart from the frame wall 313 by a first distance B.

The middle coupler 324 may be elongated from the frame wall 313 and may face or contact the bending part 133. The middle leg 311c may extend from the support surface 311a and may be parallel to the middle coupler 324. The middle leg 311c may be supported on the rear plate 131 of the frame 130. A gap or space may be formed between the middle leg 311c and the middle coupler 324, and the bending part 133 of the frame 130 may be inserted between the middle leg 311c and the middle coupler 324. The front leg 311b may be elongated from the support surface 311a and may be parallel to the middle leg 311c. A gap or space may be formed between the front leg 311b and the middle leg 311c. The front leg 311b may be supported on the rear plate 131 of the frame 130.

The outer frame 400 may include a vertical portion 411 and a horizontal portion 412. The vertical portion 412 may cover the middle coupler 324 of the inner frame 310, 330. The vertical portion 412 may face or contact the middle coupler 324. The horizontal portion 412 may be connected to the vertical portion 412 and may cover the frame wall 313 of the inner frame 310, 330 and the optical sheet 125. A pad 416 may be disposed between the horizontal portion 411 and the optical sheet 125 and may be fixed or adhered to the horizontal portion 411. The pad 416 may allow the optical layer 123 and/or the optical sheet 125 to come into close contact with the support surface 311a of the inner frame 310, 330.

The substrate 222 may be placed on the rear plate 131 of the frame 130. The reflective sheet 226 may be placed on the substrate 222.

A side reflector 500 may be coupled or fixed to the front leg 311b of the inner frame 310, 330. The side reflector 500 may be elongated to cover the front leg 311b of the inner frame 310, 330. The side reflector 500 may include a white material. The reflective sheet 226 may also cover the outer surface of the side reflector 500. A fluorescent material may be applied to the outer surface of the side reflector 500. For example, the fluorescent material may include a green-based and/or red-based phosphor. Accordingly, a yellowish phenomenon occurring in an area adjacent to the side surface of the optical layer 123 may be improved.

Figure 32:
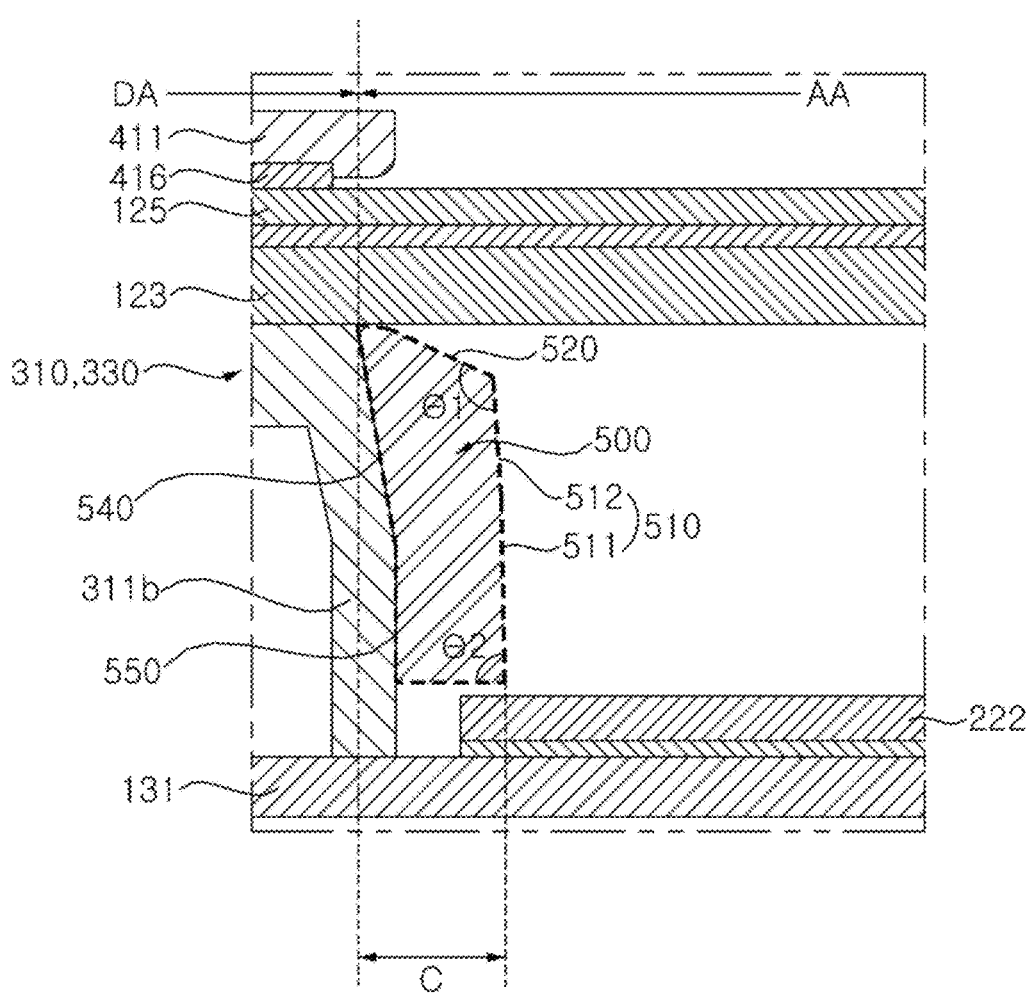

Referring to FIGS. 31 and 32, in an area of contact between the optical layer 123 and a seating surface 311a, a second distance A between the front leg 311b and the middle leg 311c may be substantially equal to a first distance B between the side surface of the optical layer 123 and the frame wall 313.

If the second distance A is greater than the first distance B, the optical layer 123 is bent due to thermal expansion of the optical layer 123. As the optical layer 123 is bent, the optical sheet 125 rubs against the outer frame 400, causing scratches and damaging the alignment of the display panel 110. The damage to the optical layer 123 and the optical sheet 125 may deteriorate the image quality of the display device.

If the second distance A is smaller than the first distance B, the optical layer 123 is contracted, such that the optical layer 123 may be peeled off from the seating surface 311a. When the optical layer 123 is peeled off, an image defect may occur.

Figure 33:
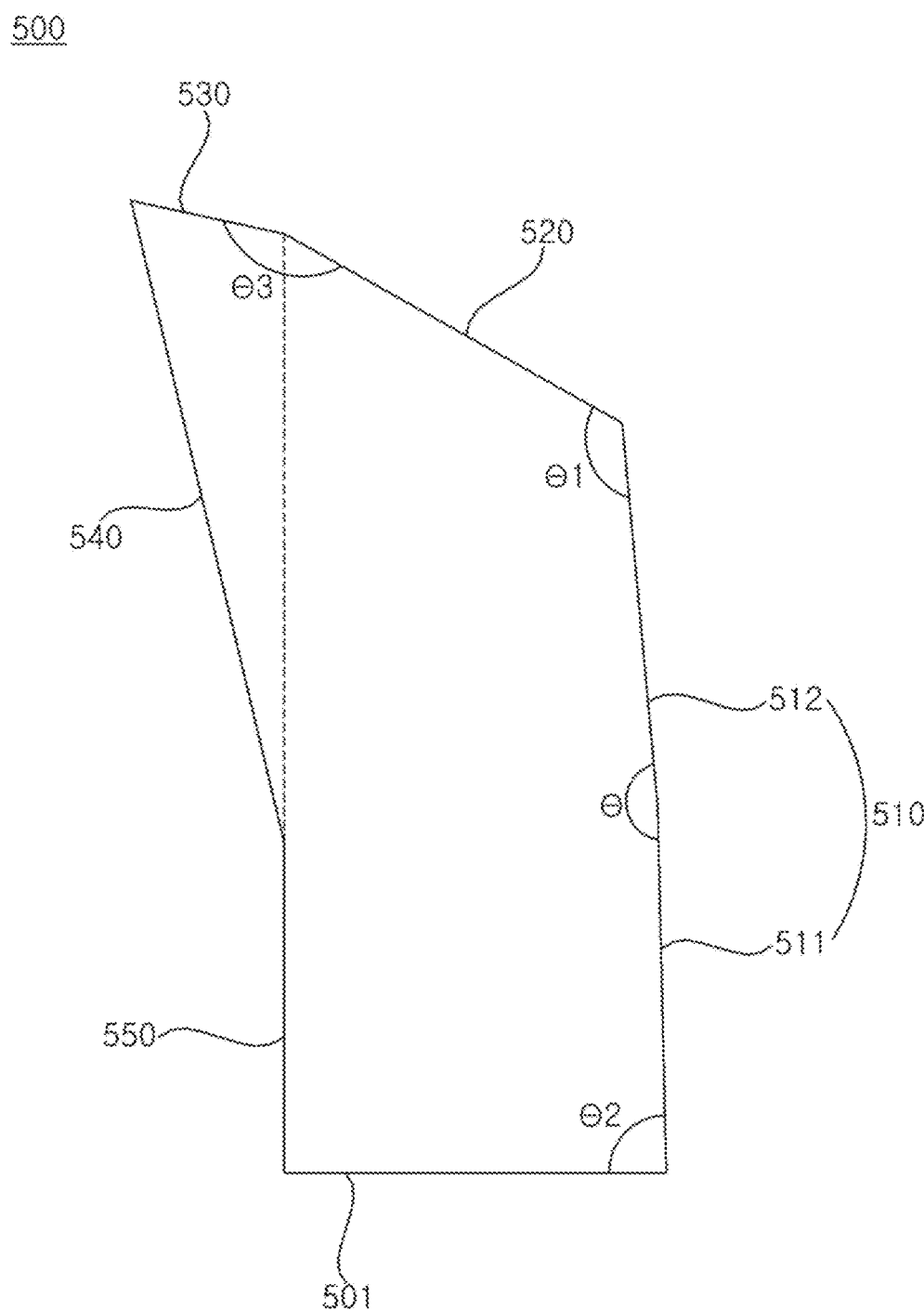

Referring to FIGS. 32 and 33, the side reflector 500 may include a first surface 510, a second surface 520, a third surface 530, a fourth surface 540, a fifth surface 550, and a base surface 501. The base surface 501 may be parallel to or face the substrate 222 and/or the rear plate 131. The base surface 501 may be spaced apart from the substrate 222.

The first surface 510 may extend from the base surface 501. The first surface 510 may form an outer surface. The first surface 510 may be referred to as a side surface 510. The first surface 510 may form a second angle theta 2 with respect to the base surface 501. The second angle theta 2 may be an acute angle. For example, the second angle theta 2 may range from 85 to 90 degrees. The first surface 510 may include a plurality of surfaces. For example, the first surface 510 may form a polygonal surface. The first surface 510 may include a lower surface 511 and an upper surface 512. The lower surface 511 may be connected to the base surface 501, and the upper surface 512 may be connected to the second surface 520. The upper surface 512 may be a surface having a predetermined angle with respect to the lower surface 511. For example, the predetermined angle may be an obtuse angle.

The second surface 520 may be connected to the first surface 510. The second surface 520 may be referred to as a first inclined surface 520. The second surface 520 may form a predetermined first angle theta 1 with respect to the first surface 510. For example, the first angle theta 1 may be an obtuse angle. For example, the first angle theta 1 may range from 110 to 130 degrees. In another example, the first angle theta 1 may range from 115 to 125 degrees. The first angle theta 1 may be greater than the second angle theta 2. The second surface 520 may reflect light to the optical layer 123.

The third surface 530 may be connected to the second surface 520. The third surface 530 may be referred to as a second inclined surface 530. The third surface 530 may form a predetermined third angle theta 3 with respect to the second surface 520. For example, the third angle theta 3 may be an obtuse angle. The third angle theta 3 may be greater than the first angle theta 1. When the optical layer 123 is contracted, the third surface 530 may support the optical layer 123. When the optical layer 123 is expanded, the third surface 530 may reflect light to the optical layer 123. The first surface 510, the second surface 520, and/or the third surface 530 may be reflecting surfaces.

The fourth surface 540 may be connected to the third surface 530, and the fifth surface 550 may be connected to the base surface 501. The fifth surface 550 may contact the fourth surface 540. The fourth surface 540 and the fifth surface 550 may be recessed inward of the side reflector 500. The fourth surface 540 and/or the fifth surface 550 may be in contact with or adhered to the front leg 311b of the inner plate 310, 330. The fourth surface 540 and/or the fifth surface 550 may be adhesion surfaces.

A boundary between the second surface 520 and the third surface 530 may be disposed in alignment with an extension line of the fifth surface 550. The second surface 520 may correspond to the active area AA of the display panel 110, and the third surface 530 may correspond to the de-active area DA of the display panel 110.

Accordingly, it is possible to increase the quantity of light to be provided to the display panel 110 and the optical layer 123, and to ensure structural stability of the optical layer 123.

Figure 34:
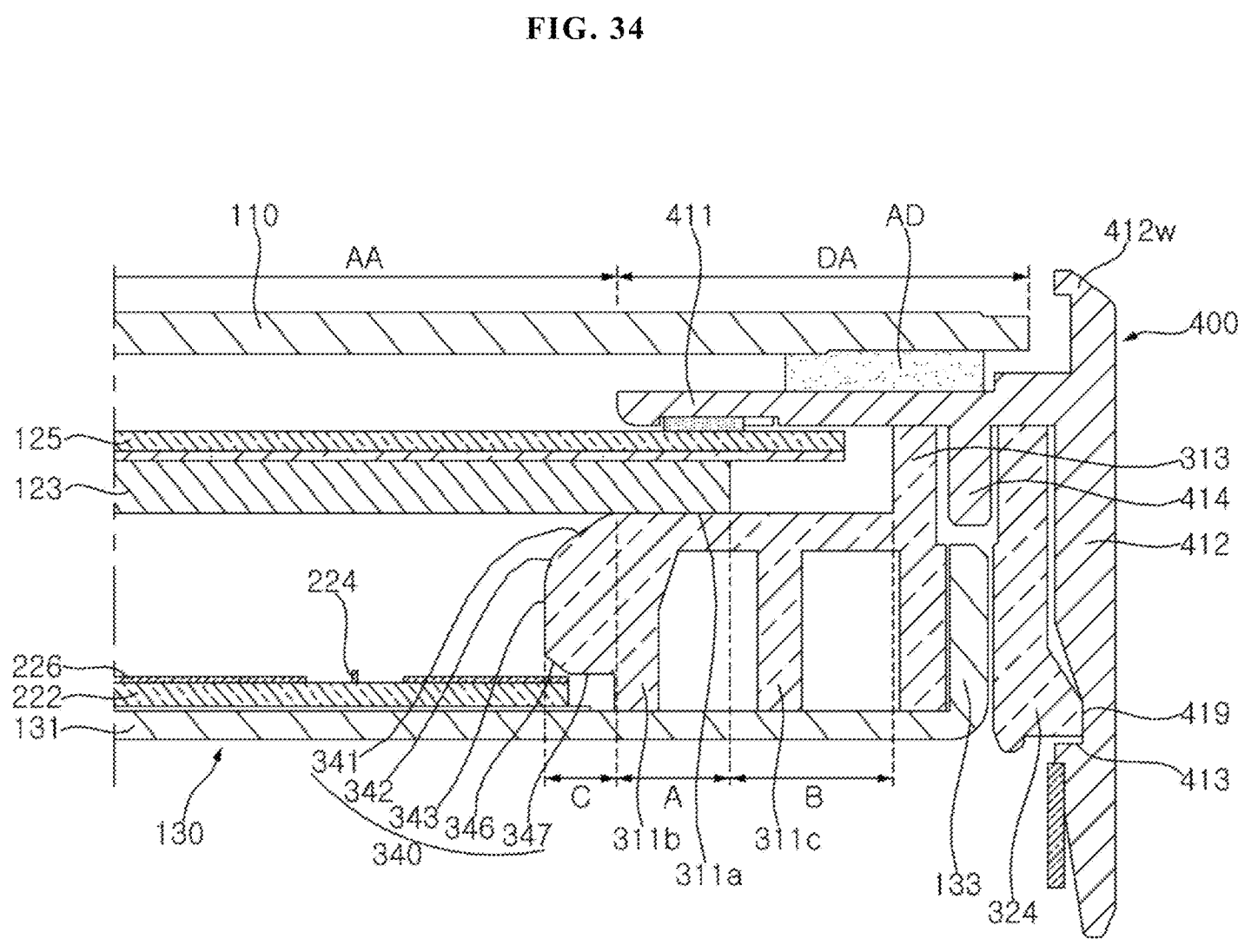

Referring to FIG. 34, the inner frame 310, 330 may include the frame wall 313 and the support part 311a. The support part 311a may be referred to as the support surface 311a. The frame wall 313 may extend in a thickness direction intersecting the longitudinal direction of the display panel 110. The support part 311a may extend in a direction parallel to the longitudinal direction of the display panel 110. The support part 311a may intersect the frame wall 313.

The inner frame 310, 330 may include the front leg 311b and the middle leg 311c. The front leg 311b may extend downward from the support part 311a, in parallel with the frame wall 313. The front leg 311b may be opposite the frame wall 313 with respect to the support part 311a. The middle leg 311c may be disposed between the front leg 311b and the frame wall 313. The middle leg 311c may extend parallel to the front leg 311b and/or the frame wall 313.

The inner frame 310, 330 may include a sub-support part 340. The sub-support part 340 may be formed on the outer surface of the front leg 311b. The sub-support part 340 may be formed as one body with the front leg 311b. The sub-support part 340 may include an inclined surface 341, a round surface 342, a side surface 343, a tapered surface 346, and a lower surface 347. The inclined surface 341 may extend from the support surface 311a. The inclined surface 341 may be inclined with respect to the support surface 311a. A gap may be formed between the inclined surface 341 and the rear surface of the optical layer 123. For example, the inclined surface 341 may be inclined at 30 to 60 degrees with respect to the support surface 311a. A boundary between the support surface 311a and the inclined surface 341 may be aligned with the boundary between the active area AA and the de-active area DA of the display panel 110.

The round surface 342 may extend from the inclined surface 341. The round surface 342 may have a predetermined curvature. The side surface 343 may extend from the round surface 342 and may be parallel to the front leg 311b and/or the frame wall 313. The lower surface 347 may be parallel to the rear surface of the optical layer 123 and may protrude from the front leg 311b to extend in a direction intersecting a longitudinal direction of the front leg 311b. The tapered surface 346 may connect the side surface 343 and the lower surface 347. The tapered surface 346 may be formed by tapering a corner edge at which the side surface 343 and the lower surface 347 meet. The tapered surface 346 may overlap the substrate 222 and/or a distal end of the reflective sheet 226. An outer surface of the sub-support part 340 may be coated with a reflective material.

A first distance B from the side surface of the optical layer 123 to the frame wall 313 may be greater than a second distance A by which the optical layer 123 and the support surface 311a overlap. The second distance A may be greater than a third distance C between the side surface 343 of the sub-support part 340 and the front leg 311b. A sum of the second distance A and the third distance C may correspond to the first distance B. For example, the sum of the second distance A and the third distance C may be substantially equal to the first distance B.

Accordingly, even when the optical layer 123 is expanded or contracted by heat, the optical layer 123 may be stably placed on the support surface 311a. For example, a distance that the side surface of the optical layer 123 extends toward the frame wall 313 when the optical layer 123 is expanded may be smaller than the first distance B. In addition, a distance that the side surface of the optical layer 123 moves away from the frame wall 313 when the optical layer 123 is contracted may be smaller than the third distance C.

Accordingly, light provided by the optical assembly 224 is reflected by the side surface 343, the round surface 342, and the inclined surface 341 of the sub-support part 340, and enters a gap formed between the optical layer 123 and the sub-support part 340, such that the light may be provided uniformly to a distal end of the active area AA of the display panel 110. In addition, the light reflected from the substrate 222 and the reflective sheet 226 may be recycled by the tapered surface 346.

Figure 35:
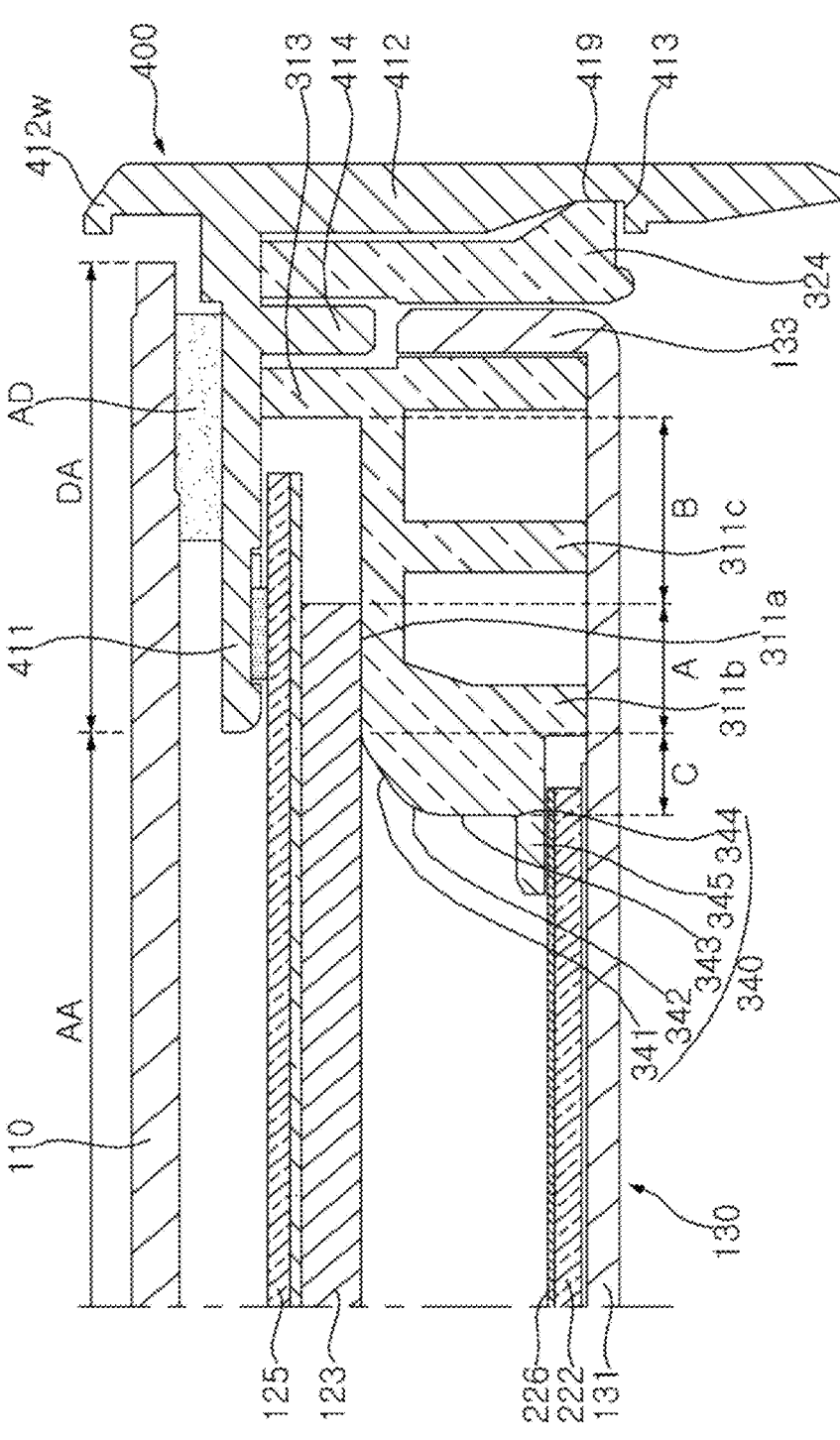
Figure 36:
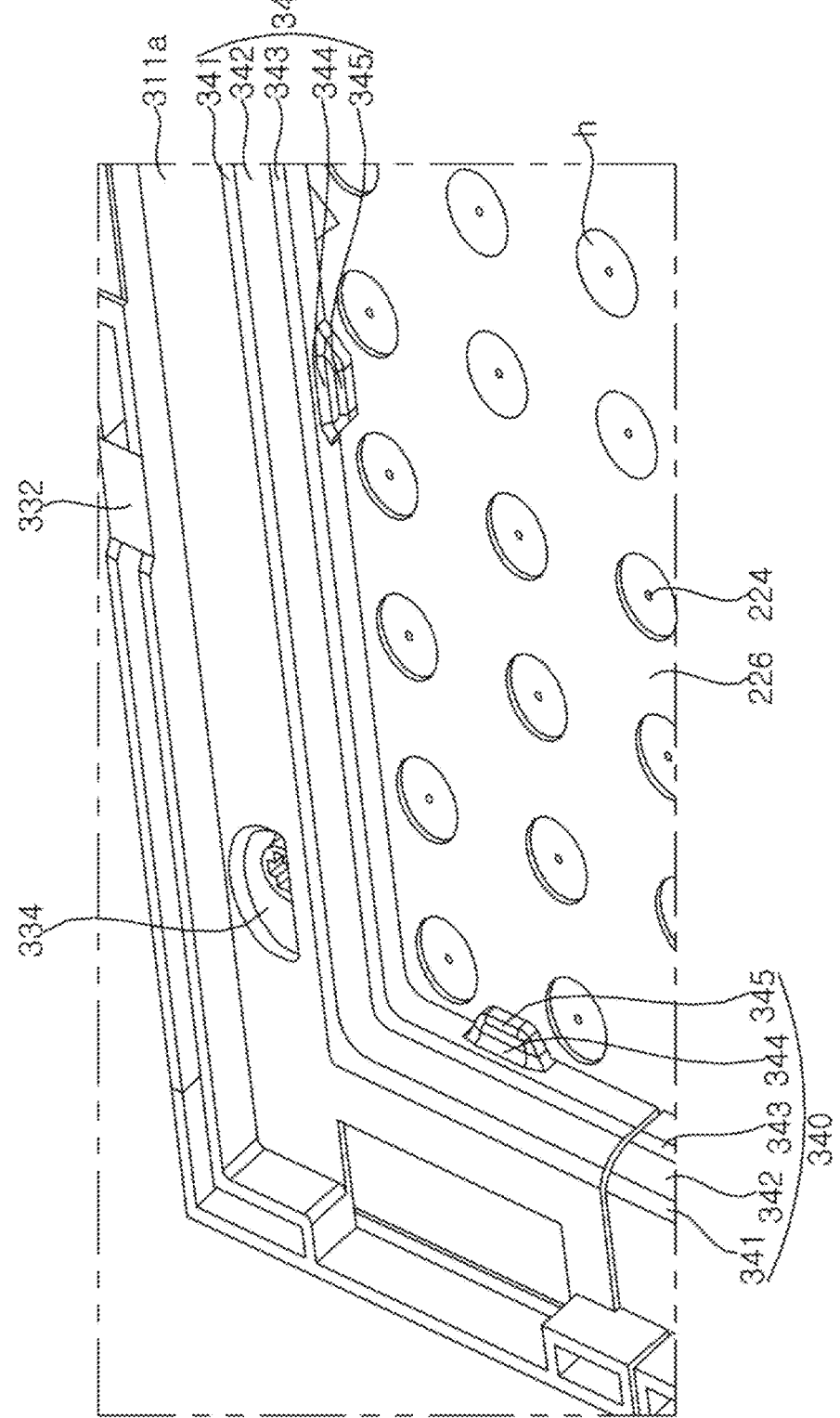

Referring to FIGS. 35 and 36, the inner frame 310, 330 may include the frame wall 313 and the support part 311a. The support part 311a may be referred to as the support surface 311a. The frame wall 313 may extend in a thickness direction intersecting the longitudinal direction of the display panel 110. The support part 311a may extend in a direction parallel to the longitudinal direction of the display panel 110. The support part 311a may intersect the frame wall 313.

The inner frame 310, 330 may include the front leg 311b and the middle leg 311c. The front leg 311b may extend downward from the support part 311a, in parallel with the frame wall 313. The front leg 311b may be opposite the frame wall 313 with respect to the support part 311a. The middle leg 311c may be disposed between the front leg 311b and the frame wall 313. The middle leg 311c may extend parallel to the front leg 311b and/or the frame wall 313.

The inner frame 310, 330 may include a sub-support part 340. The sub-support part 340 may be formed on the outer surface of the front leg 311b. The sub-support part 340 may be formed as one body with the front leg 311b. The sub-support part 340 may include an inclined surface 341, a round surface 342, a side surface 343, and a foot 345. The inclined surface 341 may extend from the support surface 311a. The inclined surface 341 may be inclined with respect to the support surface 311a. A gap may be formed between the inclined surface 341 and the rear surface of the optical layer 123. For example, the inclined surface 341 may be inclined at 30 to 60 degrees with respect to the support surface 311a. A boundary between the support surface 311a and the inclined surface 341 may be aligned with the boundary between the active area AA and the de-active area DA of the display panel 110.

The round surface 342 may extend from the inclined surface 341. The round surface 342 may have a predetermined curvature. The side surface 343 may extend from the round surface 342 and may be parallel to the front leg 311b and/or the frame wall 313.

The foot 345 may protrude from the side surface 343. The foot 345 may extend in a direction parallel to the substrate 222 and/or the reflective sheet 226. The foot 345 may overlap the substrate 222 and/or the reflective sheet 226. The foot 345 may press the substrate 222 and/or the reflective sheet 226. The foot 345 may be disposed between the optical assembly 224 and the optical assembly 224. The foot 345 may be disposed between the hole h and the hole h of the reflective sheet 226 in which the optical assembly 224 is disposed. The reflective sheet 226 may be stably secured by the foot 345. The round surface 344 may connect the foot 345 and the side surface 343. An outer surface of the sub-support part 340 may be coated with a reflective material.

A first distance B from the side surface of the optical layer 123 to the frame wall 313 may be greater than a second distance A by which the optical layer 123 and the support surface 311a overlap. The second distance A may be greater than a third distance C between the side surface 343 of the sub-support part 340 and the front leg 311b. A sum of the second distance A and the third distance C may correspond to the first distance B. For example, the sum of the second distance A and the third distance C may be substantially equal to the first distance B.

Accordingly, even when the optical layer 123 is expanded or contracted by heat, the optical layer 123 may be stably placed on the support surface 311a. For example, a distance that the side surface of the optical layer 123 extends toward the frame wall 313 when the optical layer 123 is expanded may be smaller than the first distance B. In addition, a distance that the side surface of the optical layer 123 moves away from the frame wall 313 when the optical layer 123 is contracted may be smaller than the third distance C.

Accordingly, light provided by the optical assembly 224 is reflected by the side surface 343, the round surface 342, and the inclined surface 341 of the sub-support part 340, and enters a gap formed between the optical layer 123 and the sub-support part 340, such that the light may be provided uniformly to a distal end of the active area AA of the display panel 110. In addition, the substrate 222 and/or the optical sheet 226 may be stably secured even when the substrate 222 and/or the optical sheet 226 is expanded or contracted by heat.

Referring to FIGS. 1 to 36, a display device includes: a display panel 110; a frame 130 disposed at a rear of the display panel 110; a substrate 222 disposed on the frame 130 and having a light source 224 that provides light; an inner frame 310, 330 coupled to the frame 130 and supporting the display panel 110; and an optical layer 123 disposed between the display panel 110 and the inner frame 310, 330, the optical layer 123 placed on the inner frame 310, 330, wherein the inner frame 310, 330 includes: a support part 311a on which the optical layer 123 is placed; and a sub-support part 340 disposed between the optical layer 123 and the frame 130, the sub-support part 340 formed on the inner frame 310, 330, wherein the sub-support part 340 includes: a lower surface 347 disposed adjacent to the substrate 222; an inclined surface 341 disposed adjacent to a lower surface of the optical layer 123, the inclined surface 341 reflecting the light, provided by the light source 224, to the optical layer 123; and a side surface 343 connecting the lower surface 347 and the inclined surface 341, the side surface 343 reflecting the light provided by the light source 224.

The sub-support part 340 may further include a round surface 342 connecting the side surface 343 and the inclined surface 341, wherein the inclined surface 341 and the side surface 343 may form an obtuse angle.

The sub-support part 340 may further include a tapered surface 346 connecting the side surface 343 and the lower surface 347, wherein the tapered surface 346 may overlap the substrate 222.

The display panel 110 may include: an active area AA on which an image is displayed; and a de-active area DA formed around the active area AA, wherein the support part 311a of the inner frame 310, 330 may be aligned with the de-active area, and the sub-support part 340 of the inner frame 310, 330 may be aligned with the active-area AA.

The inner frame 310, 330 may include a frame wall 313 that is opposite a side surface of the optical layer 123 with respect to the support part 311a, wherein a first distance B from the frame wall 313 to the side surface of the optical layer 123 may be greater than a second distance A by which the optical layer 123 and the support part 311*a* overlap.

The second distance A may be greater than a third distance C which is a length of a lower surface of the sub-support part 311*a*.

A sum of the second distance A and the third distance C may be substantially equal to the first distance B.

The sub-support part 340 may further include a foot 345 that extends by protruding from the side surface 343 of the sub-support part 340, the foot 345 having a bottom that forms the lower surface and having an upper surface connected to the side surface 343, wherein the foot 345 may overlap an upper surface of the substrate 222.

The substrate 222 may include a plurality of light sources 224, wherein the plurality of light sources 224 may be spaced apart from each other, and the foot 345 may be disposed between the plurality of light sources 224.

When being contracted, the optical layer 123 may be supported by the sub-support part 340.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

The invention claimed is:

1. A display device comprising:
a display panel;
a frame disposed at a rear of the display panel;
a substrate disposed on the frame and having a light source that provides light;
an inner frame coupled to the frame and supporting the display panel; and
an optical layer disposed between the display panel and the inner frame, the optical layer placed on the inner frame,
wherein the inner frame comprises:
a support part on which the optical layer is placed; and
a sub-support part disposed between the optical layer and the frame, the sub-support part formed on the inner frame,
wherein the sub-support part comprises:
a lower surface disposed adjacent to the substrate;

an inclined surface disposed adjacent to a lower surface of the optical layer, the inclined surface reflecting the light, provided by the light source, to the optical layer; and
a side surface connecting the lower surface and the inclined surface, the side surface reflecting the light provided by the light source.

2. The display device of claim 1, wherein the sub-support part further comprises a round surface connecting the side surface and the inclined surface,
wherein the inclined surface and the side surface form an obtuse angle.

3. The display device of claim 2, wherein the sub-support part further comprises a tapered surface connecting the side surface and the lower surface,
wherein the tapered surface overlaps the substrate.

4. The display device of claim 1, wherein the display panel comprises:
an active area on which an image is displayed; and
a de-active area formed around the active area,
wherein the support part of the inner frame is aligned with the de-active area, and the sub-support part of the inner frame is aligned with the active-area.

5. The display device of claim 1, wherein the inner frame comprises a frame wall that is opposite a side surface of the optical layer with respect to the support part,
wherein a first distance from the frame wall to the side surface of the optical layer is greater than a second distance by which the optical layer and the support part overlap.

6. The display device of claim 5, wherein the second distance is greater than a third distance which is a length of a lower surface of the sub-support part.

7. The display device of claim 6, wherein a sum of the second distance and the third distance is substantially equal to the first distance.

8. The display device of claim 1, wherein the sub-support part further comprises a foot that extends by protruding from the side surface of the sub-support part, the foot having a bottom that forms the lower surface and having an upper surface connected to the side surface,
wherein the foot overlaps an upper surface of the substrate.

9. The display device of claim 8, wherein the substrate comprises a plurality of light sources,
wherein the plurality of light sources are spaced apart from each other, and the foot is disposed between the plurality of light sources.

10. The display device of claim 1, wherein when being contracted, the optical layer is supported by the sub-support part.

* * * * *